(12) United States Patent
Noguchi et al.

(10) Patent No.: US 10,250,763 B2
(45) Date of Patent: Apr. 2, 2019

(54) INPUT DEVICE, IMAGE FORMING APPARATUS, AND NON-TRANSITORY COMPUTER READABLE MEDIUM

(71) Applicant: FUJI XEROX CO., LTD., Tokyo (JP)

(72) Inventors: Nozomi Noguchi, Kanagawa (JP); Asako Takayama, Kanagawa (JP); Shunsuke Kodaira, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 15/689,506

(22) Filed: Aug. 29, 2017

(65) Prior Publication Data

US 2018/0278763 A1 Sep. 27, 2018

(30) Foreign Application Priority Data

Mar. 21, 2017 (JP) .................................. 2017-054920

(51) Int. Cl.
*G06F 3/12* (2006.01)
*H04N 1/00* (2006.01)

(52) U.S. Cl.
CPC ..... *H04N 1/00381* (2013.01); *H04N 1/00424* (2013.01); *H04N 1/00458* (2013.01); *H04N 2201/0094* (2013.01)

(58) Field of Classification Search
CPC ........... H04N 1/00411; H04N 1/00493; H04N 2201/0094; H04N 1/00424; G06F 3/04855; G06F 2203/04104; G06F 2203/04108
See application file for complete search history.

(56) References Cited

U.S. PATENT DOCUMENTS

| 2007/0052693 | A1 | 3/2007 | Watari | |
| 2008/0291173 | A1* | 11/2008 | Suzuki | A63F 13/10 345/173 |
| 2013/0162575 | A1* | 6/2013 | Kaigawa | G06F 3/0412 345/173 |
| 2014/0146085 | A1* | 5/2014 | Takeda | G06F 1/1632 345/648 |

FOREIGN PATENT DOCUMENTS

JP 2007-65767 A 3/2007

* cited by examiner

*Primary Examiner* — Moustapha Diaby
(74) *Attorney, Agent, or Firm* — Oliff PLC

(57) ABSTRACT

An input device includes a display on which an operation screen is displayed, at least one protrusion displayed along an outer edge of the display, and a detector in which a display region of the display is set as a detection region. In a case where a continuous operation input in a direction provided with the protrusion is detected, a function corresponding to the continuous operation input is enabled faster than in a case where a continuous operation input in a direction different from the direction is detected.

11 Claims, 20 Drawing Sheets

FIG. 10
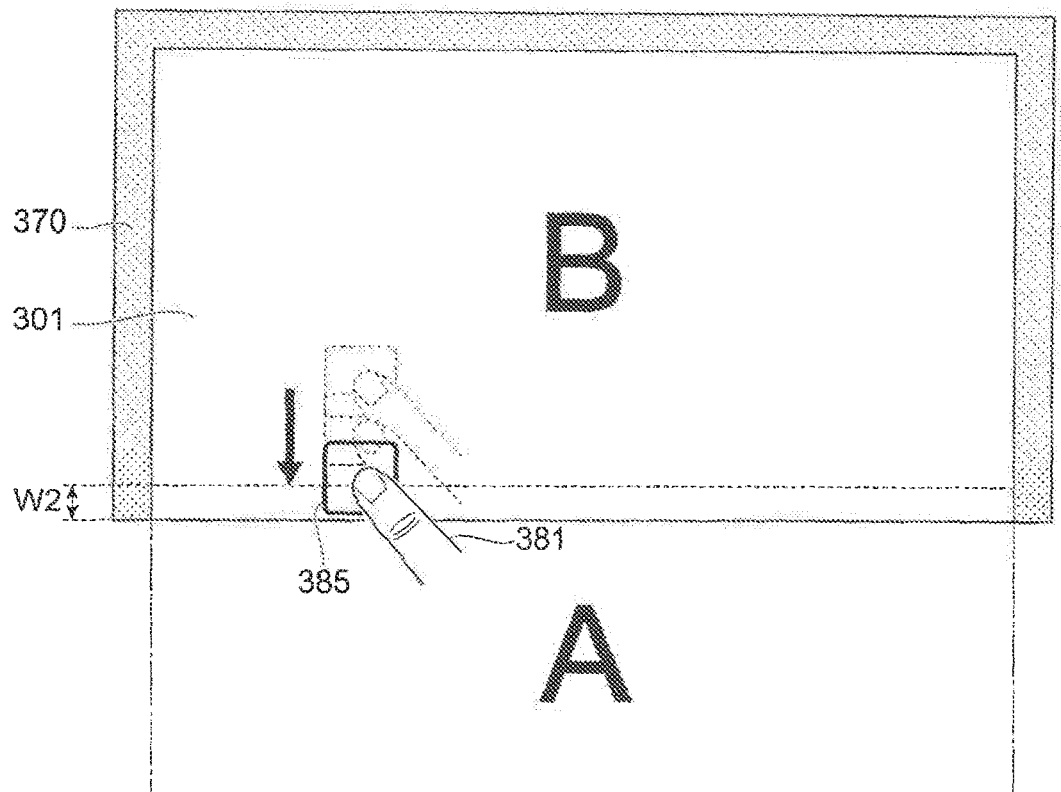
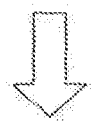
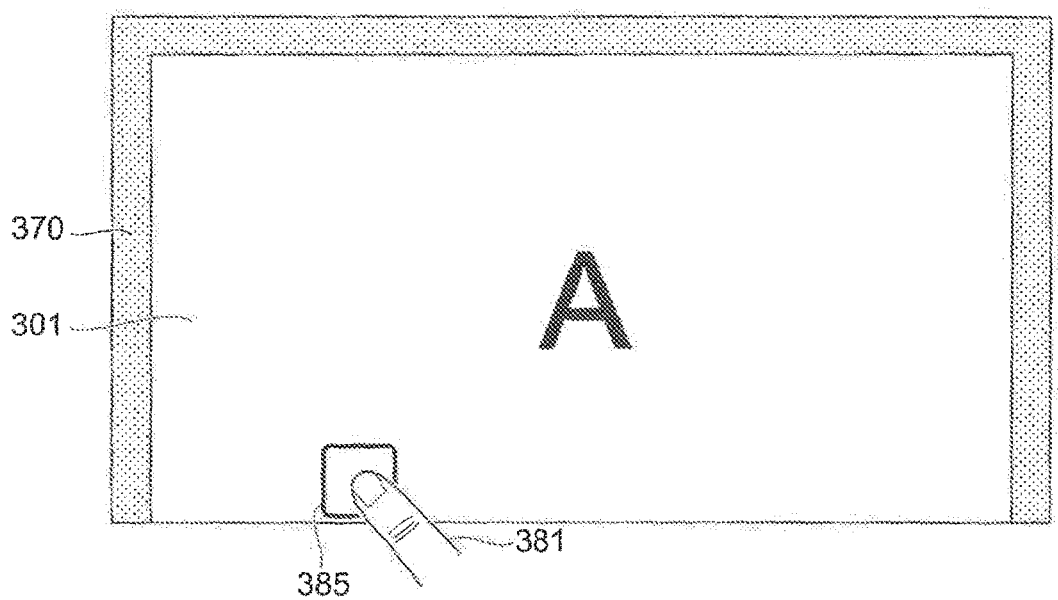

INPUT DEVICE, IMAGE FORMING APPARATUS, AND NON-TRANSITORY COMPUTER READABLE MEDIUM

CROSS-REFERENCE TO RELATED APPLICATIONS

This application is based on and claims priority under 35 USC 119 from Japanese Patent Application No. 2017-054920 filed Mar. 21, 2017.

BACKGROUND

Technical Field

The present invention relates to input devices, image forming apparatuses, and non-transitory computer readable media.

SUMMARY

According to an aspect of the invention, there is provided an input device including a display on which an operation screen is displayed, at least one protrusion displayed along an outer edge of the display, and a detector in which a display region of the display is set as a detection region. In a case where a continuous operation input in a direction provided with the protrusion is detected, a function corresponding to the continuous operation input is enabled faster than in a case where a continuous operation input in a direction different from the direction is detected.

BRIEF DESCRIPTION OF THE DRAWINGS

Exemplary embodiments of the present invention will be described in detail based on the following figures, wherein:

FIG. 10 illustrates a case where the icon is dragged to a subsequent page hidden at the lower side;

DETAILED DESCRIPTION

Exemplary embodiments of the present invention will be described in detail below with reference to the drawings.

First Exemplary Embodiment

An image forming apparatus will be described here as an example. The image forming apparatus according to this exemplary embodiment forms an image onto a recording medium (which may sometimes be representatively referred to as "sheet" hereinafter) and has a copying function, a scanning function, a facsimile transmitting-receiving function, and a printing function. The image forming apparatus does not necessarily have to be equipped with all of these functions and may be an apparatus specialized in any one of the functions, such as a photocopier, a scanner, a facsimile transmitter-receiver, or a printer (including a three-dimensional printer).

Overall Configuration of Image Forming Apparatus

Figure 1:
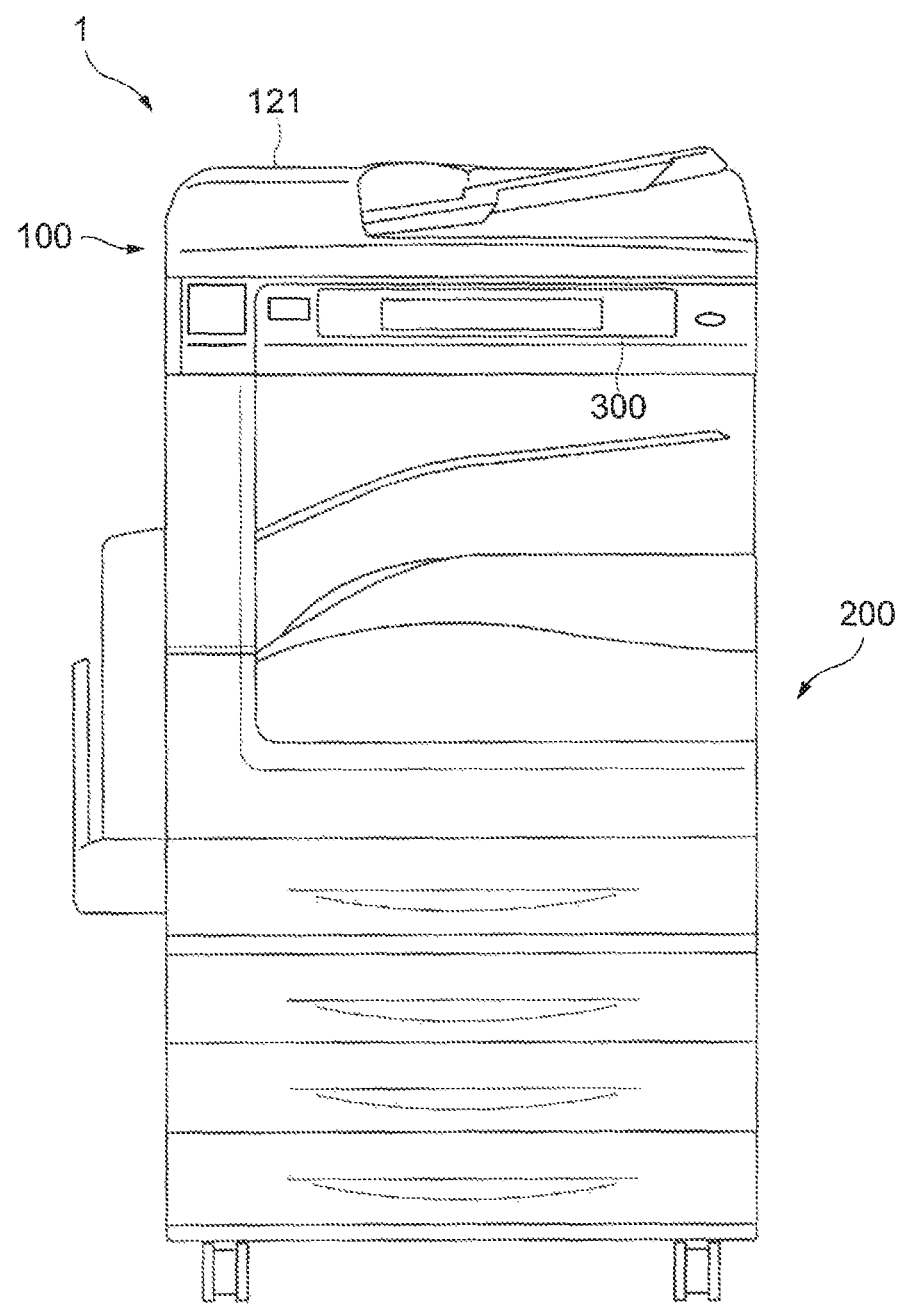
FIG. 1 is an external view of an image forming apparatus according to a first exemplary embodiment.
Figure 2:
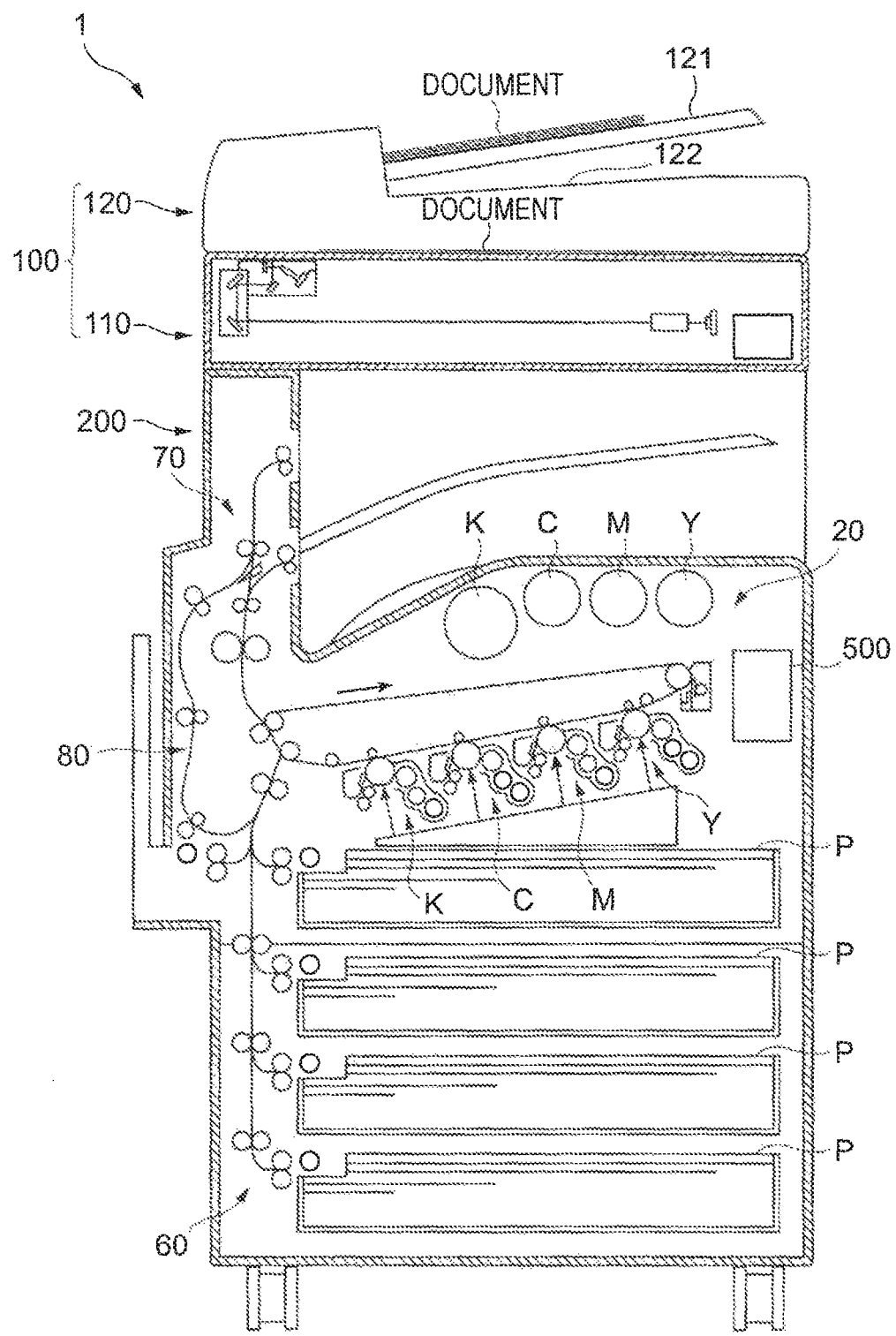
FIG. 2 illustrates the internal structure of the image forming apparatus according to the first exemplary embodiment.

FIG. 1 is an external view of an image forming apparatus 1 according to a first exemplary embodiment. FIG. 2 illustrates the internal structure of the image forming apparatus 1 according to the first exemplary embodiment.

The image forming apparatus 1 includes an image reading device 100 that reads an image of a document and an image recording device 200 that records the image onto a recording medium. The image forming apparatus 1 also includes a user interface (UI) 300 that receives an operation input by a user and that displays various types of information to the user. Moreover, the image forming apparatus 1 includes a controller 500 that controls the overall operation of the image forming apparatus 1. The controller 500 is an example of a detector.

The image reading device 100 is disposed at an upper portion of the image forming apparatus 1. The image recording device 200 is disposed below the image reading device 100 and contains the controller 500 therein. The user interface 300 is disposed at the front side of the upper portion of the image forming apparatus 1, that is, at the front side of an image reading unit 110, which will be described later, of the image reading device 100.

First, the image reading device 100 will be described.

The image reading device 100 includes the image reading unit 110 that reads an image of a document and a document transport unit 120 that transports the document to the image reading unit 110. The document transport unit 120 is disposed at an upper portion of the image reading device 100, and the image reading unit 110 is disposed at a lower portion of the image reading device 100.

The document transport unit 120 has a document accommodating section 121 that accommodates a document or documents and a document output section 122 to which a document transported from the document accommodating section 121 is output, and transports the document from the document accommodating section 121 to the document output section 122. The document transport unit 120 is also called an auto document feeder (ADF).

Next, the image recording device 200 will be described.

The image recording device 200 includes an image forming unit 20 that forms an image onto a sheet P, a sheet feeding unit 60 that feeds the sheet P to the image forming unit 20, a sheet output unit 70 that outputs the sheet P having an image formed thereon at the image forming unit 20, and an inversion transport unit 80 that inverts the front and rear faces of the sheet P having the image formed on one face thereof at the image forming unit 20 and transports the sheet P again toward the image forming unit 20.

The user interface 300 is an example of an input unit (i.e., input device) used for inputting a user command to the apparatus (i.e., the image forming apparatus 1) and includes a display unit and an operation receiving unit, which will be described in detail later. The display unit displays a screen for providing various types of information and also displays software buttons associated with individual functions. The operation receiving unit has, for example, a function of detecting an operation performed on a hardware button and a function of detecting an operation performed on a software button.

In a case where an optical detector is to be used as an operation detecting unit, a spatial region outside the display unit may be used as a detection region so long as the region is within an optically detectable range. For example, an operation performed on a symbol printed on the surface of the housing may also be detected similarly to a software button displayed on the display unit.

Basic Operation of Image Forming Apparatus

The image forming apparatus 1 operates in the following manner.

For example, the image forming apparatus 1 is capable of copying a document. Specifically, the image forming apparatus 1 supplies image data of a document read by the image reading device 100 to the image recording device 200 so as to form the image of the document onto a sheet P.

Furthermore, the image forming apparatus 1 may receive a print job from, for example, a personal computer (PC) (not shown) connected to a communication line and form a received image onto a sheet P. Specifically, the image forming apparatus 1 transmits image data contained in the print job received via the communication line to the image recording device 200 so as to form the image onto the sheet P.

Moreover, the image forming apparatus 1 is capable of performing facsimile transmission and reception. Specifically, the image forming apparatus 1 may transmit image data of a document read by the image reading device 100 via the communication line.

Furthermore, the image forming apparatus 1 is capable of storing image data of a document. Specifically, the image forming apparatus 1 may store the image data of the document in the apparatus or in the PC connected via the communication line.

Configuration of Controller and Other Devices

Figure 3:
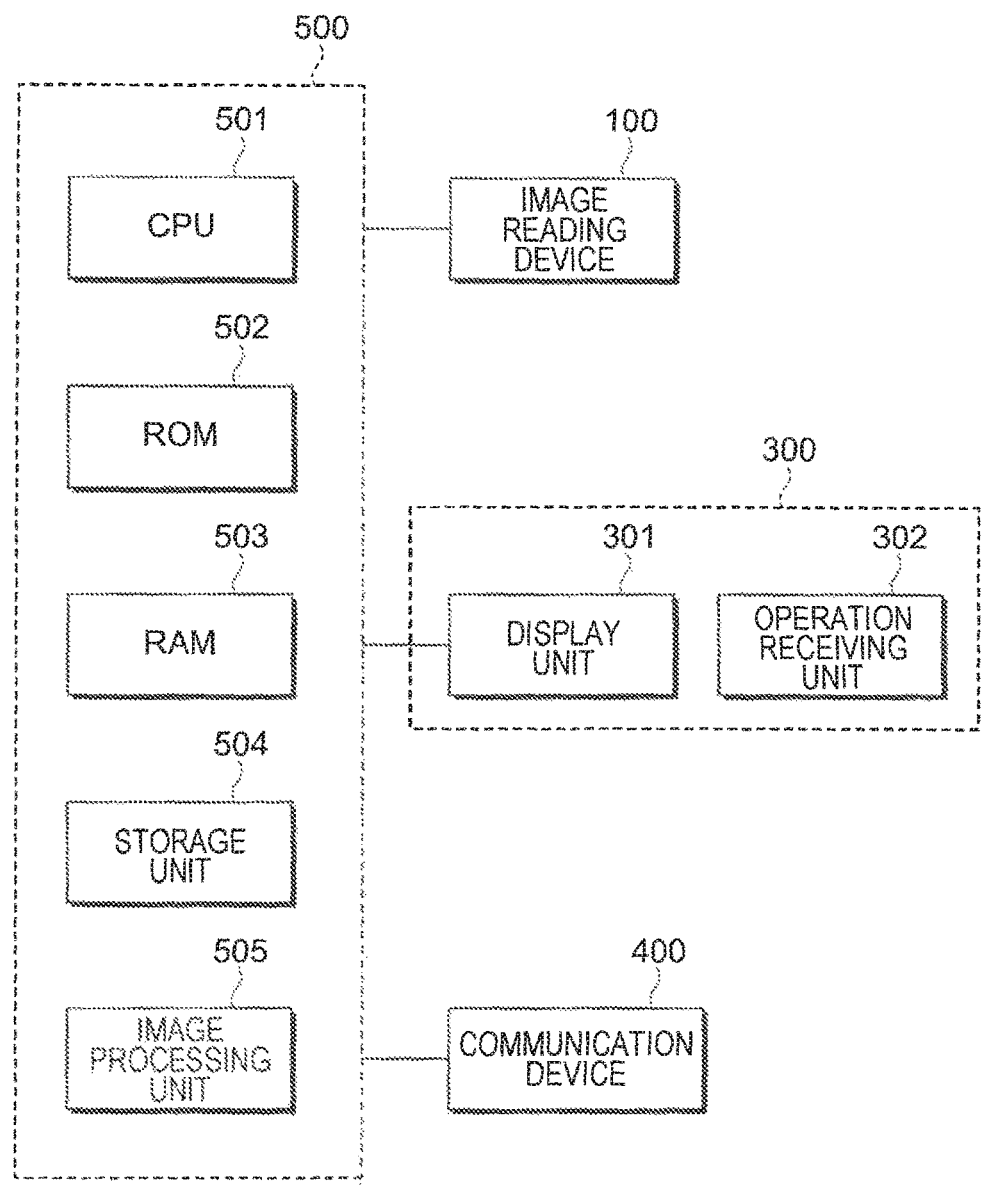
FIG. 3 illustrates an example of a functional block configuration of a controller and other devices constituting the image forming apparatus.

FIG. 3 illustrates an example of a functional block configuration of the controller 500 and other devices constituting the image forming apparatus 1.

The controller 500 includes a control unit that controls the entire apparatus (i.e., a central processing unit (CPU) 501, a read-only memory (ROM) 502, and a random access memory (RAM) 503), a storage unit 504 used for storing, for example, image data, and an image processing unit 505 that performs image processing, such as color correction and gradation correction, on an image expressed by image data. The controller 500 is an example of an information processing device.

The CPU 501 uses the RAM 503 as a work area and executes a program read from the ROM 502.

The storage unit 504 is formed of, for example, a hard disk device or a semiconductor memory and stores data related to a document image read by the image reading device 100 or an image received via a communication device 400. The storage unit 504 is also used for storing a program, where appropriate.

The image processing unit 505 is configured as, for example, a dedicated processor or a processing board and executes image processing, such as color correction and gradation correction.

The user interface 300 includes a display unit 301 used for displaying, for example, an operation screen and an operation receiving unit 302 that receives an operation input by a user. The operation receiving unit 302 is an example of a detector.

The display unit 301 is formed of, for example, a liquid-crystal display panel or an organic electroluminescence (EL) display panel.

The operation receiving unit 302 may be, for example, a contact-type coordinate input device or a noncontact-type coordinate input device. Specifically, a contact-type coordinate input device detects a change in physical quantity occurring due to a physical contact with a hardware button, such as a button or a switch, or a physical contact between an input object, such as a finger or a pen, and an operation screen (i.e., detection region), and detects the coordinate position in contact with the input object based on the detected information. A noncontact-type coordinate input device detects, in a noncontact manner, the coordinate position of an input object moving across a detection plane constituted of, for example, infrared light. An input object is an object used when making a certain command to the input device and may be, for example, a finger or a pen.

Examples of the detection method of the contact-type coordinate input device include a matrix switch method in which an electrode group arranged in the row direction and an electrode group arranged in the column direction are disposed in two upper and lower layers and in which a contact position is detected as a current-application position, a resistive film method in which two transparent electrode films (i.e., thin films functioning as resistive films) are disposed in two upper and lower layers and in which a contact position is detected based on a voltage value, a surface acoustic wave method in which vibrational waves are generated from piezoelectric elements disposed at multiple corners of a substrate, such as glass, and in which a contact position is detected based on the reflection time of the vibrational waves, an electromagnetic induction method in which a dedicated pen called an electronic pen is used, and an electrostatic capacitance method in which a contact position is detected based on a change in electrostatic capacitance occurring between a fingertip and an electro-conductive film.

The contact-type coordinate input device is disposed over the surface of the display unit 301.

On the other hand, the noncontact-type coordinate input device has a light-emitting element (light source) that emits infrared light forming an optical detection plane (detection region), and also has a sensor unit that detects the position of an input object moving across the detection plane. The sensor unit may be of a type that uses imaging cameras or a type that uses light-receiving elements. For example, in the case of the type that uses imaging cameras, the imaging cameras are disposed at opposite ends of one of the sides that constitute the detection plane. In the case where light-receiving elements, such as photodiodes (PDs), are used, there are a method in which the light-receiving elements are disposed at positions facing light-emitting elements, such as light-emitting diodes (LEDs), and a method in which the light-receiving elements and the light-emitting elements are alternately arranged in a single line.

In either case, the noncontact-type coordinate input device is disposed along at least one side of the display unit 301. In this case, the length of one side of the noncontact-type coordinate input device is set in accordance with the target region to be detected. Normally, the length of one side of the noncontact-type coordinate input device is larger than the length of one side of the display unit 301.

The communication device 400 is formed of, for example, a modem or a local-area-network (LAN) interface and is used for facsimile communication or for communication with an external device.

Operation-Input-Detection Functional Unit

Next, an operation-input-detection functional unit realized in accordance with cooperation between the user interface 300 and the controller 500 (i.e., the CPU 501) will be described. The operation-input-detection functional unit is an example of a function provided by the input device and is realized in accordance with cooperation between the user interface 300 and the controller 500 (i.e., the CPU 501). Alternatively, the operation-input-detection functional unit may be realized as a function of the user interface 300 alone.

In this exemplary embodiment, the controller 500 functioning as an input device receives information related to the position and movement of an input object in the detection region (e.g., an output column of detection coordinates) from the operation receiving unit 302 and detects the contents of an operation input by the user based on the positional relationship with individual detection ranges allocated to operators (e.g., software buttons, icons, and display items) to be operated by the user. The operators are targets of operations to be input by the user and are provided such that the presence thereof may be visually ascertained by the user. Moreover, by operating any one of the operators, the user is capable of inputting a certain kind of operation. The operators may be physically provided in the input device (e.g., in the form of buttons) or may be symbols or pictures (e.g., in the form of icons) displayed on the display screen.

In this exemplary embodiment, the detection region is a range in which the coordinates (i.e., input coordinates) of an input object are detectable by the coordinate input device. Needless to say, the detection region includes detection ranges corresponding to the individual operators.

Figure 4:
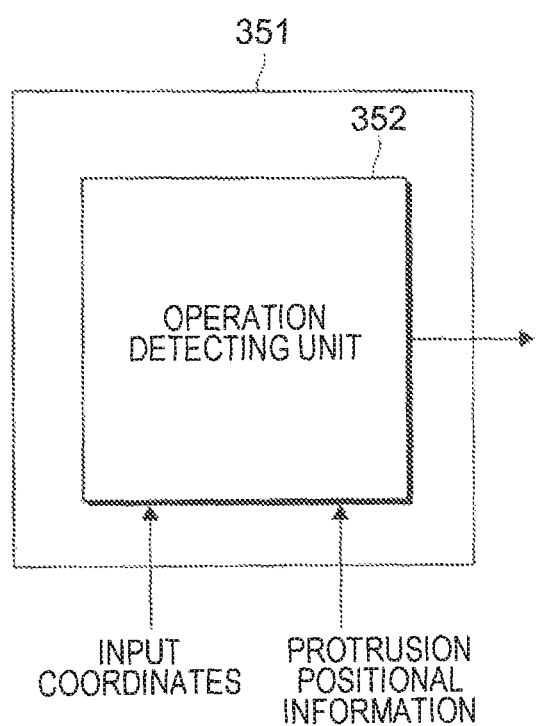
FIG. 4 illustrates an operation-input-detection functional unit used in the first exemplary embodiment.

FIG. 4 illustrates an operation-input-detection functional unit 351 used in the first exemplary embodiment.

In FIG. 4, it is assumed that a contact-type coordinate input device is used as the operation receiving unit 302. In this case, since the operation receiving unit 302 is disposed on the front surface of the display unit 301, the display region of the display unit 301 matches the input-object detection region of the operation receiving unit 302.

Furthermore, it is assumed that a frame (see FIG. 6) is disposed so as to extend along three sides of the display unit 301. In this exemplary embodiment, a structural body having a surface that is one level higher than an operation surface will be referred to as "protrusion". The frame is an example of a protrusion in that it protrudes from the display unit 301 as an operation surface.

The protrusion not only provides physical outer edges to the detection region, but also provides psychological outer edges to the user. For example, when there is an area that is one level higher like the protrusion, the user may subconsciously try to avoid touching the protrusion.

For example, in a case where a frame is provided along the upper side of the display unit 301, if a fingertip is moved toward the frame to perform an operation input, the user would subconsciously stop the operation input just before reaching the position of the frame.

With regard to an operation input, such as screen scrolling or moving to a subsequent page, an effective condition thereof is such that the coordinates of the operation input reach an execution region provided along one of the outer edges of the display region. Therefore, the operation input is less likely to become effective in the direction extending toward the frame with a high probability in which the operation input is stopped before the execution region.

The operation-input-detection functional unit 351 according to this exemplary embodiment has an operation detecting unit 352 that determines whether a function corresponding to an operation input is to be enabled based on the coordinates (input coordinates) detected by the operation receiving unit 302 and positional information of the protrusion (protrusion positional information).

In this exemplary embodiment, the protrusion positional information corresponds to positional information about three sides of the display unit 301, namely, the upper side, the left side, and the right side thereof.

Figure 5:
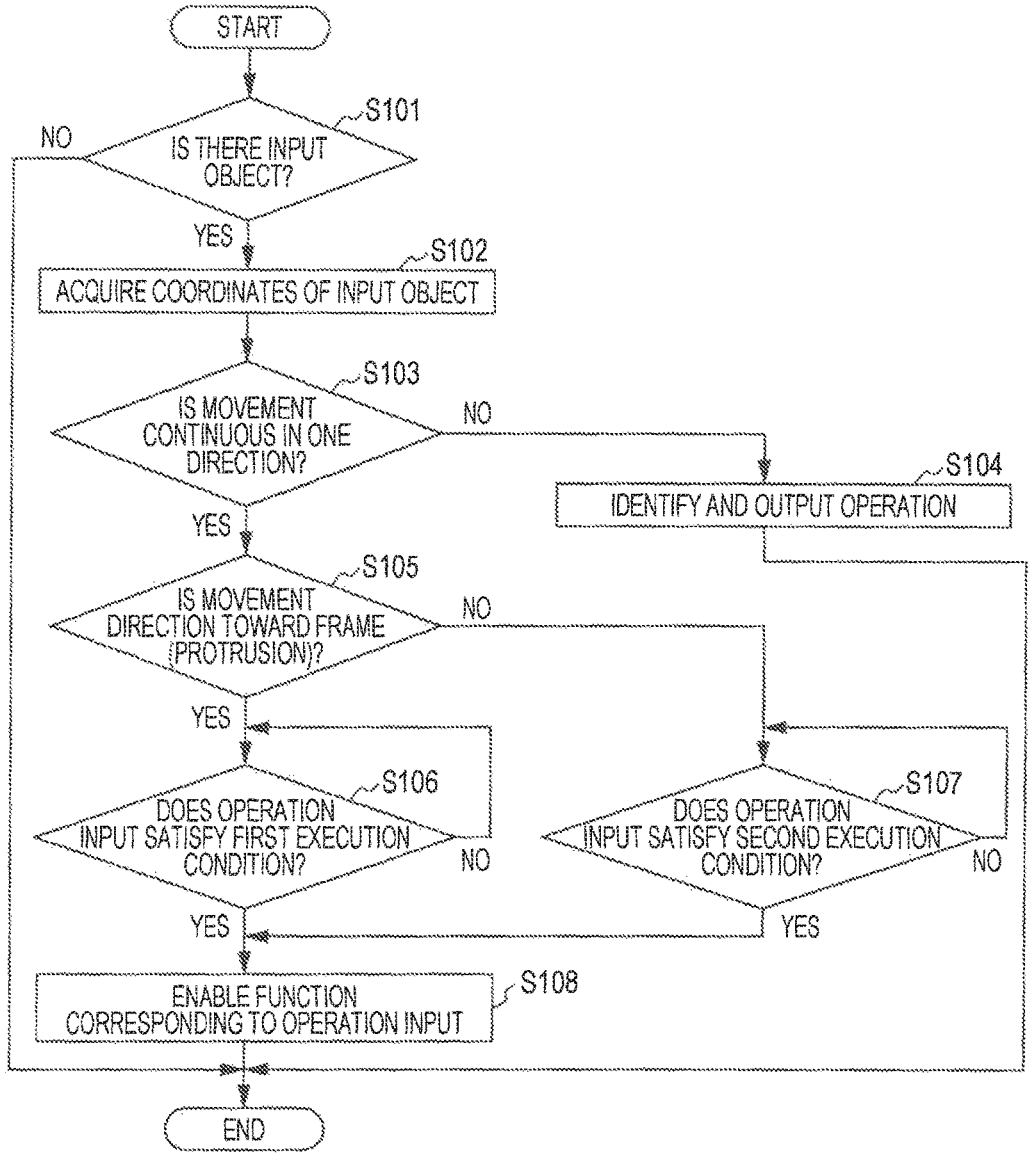
FIG. 5 is a flowchart illustrating an example of a detecting operation executed by the operation-input-detection functional unit.

FIG. 5 is a flowchart illustrating an example of a detecting operation executed by the operation-input-detection functional unit 351.

The operation-input-detection functional unit 351 executes the detecting operation shown in FIG. 5 every time a new operation input is detected.

First, in step S101, the operation detecting unit 352 determines whether or not there is an input object (e.g., a fingertip or a pen) based on whether or not there are input coordinates.

If there are no input coordinates to begin with or if the detected input coordinates have disappeared, the operation detecting unit 352 obtains a negative result and ends the detecting operation being executed. When the detecting operation ends, a new detecting operation commences.

If an input object is detected from the input coordinates, the operation detecting unit 352 acquires the coordinates of the input object in step S102. The operation detecting unit 352 acquires multiple coordinate sequences (movement trajectories) sampled for individual input objects that have been recognized.

In step S103, the operation detecting unit 352 determines whether or not the operation input is a continuous movement in one direction based on the acquired coordinate sequence.

If the operation input is not a continuous movement in one direction, the operation detecting unit 352 obtains a negative result, proceeds to step S104 to identify the operation input from the acquired coordinate sequence, and outputs the identified operation input. In step S104, it is identified whether the operation input is, for example, a tap, a double tap, or a long tap. If the operation input is a tap and a software button is allocated to the tapped coordinate position, a function associated with the software button is executed.

If the operation input is a continuous movement in one direction, the operation detecting unit 352 obtains a positive result and proceeds to step S105 to determine whether or not the direction of the movement is a direction extending toward the frame (protrusion). If the direction of the movement is a direction extending toward the frame, the operation detecting unit 352 obtains a positive result and proceeds to step S106. If the direction of the movement is a direction extending toward a region where there is no frame, the operation detecting unit 352 obtains a negative result and proceeds to step S107.

The operation detecting unit 352 proceeding to step S106 determines whether or not the operation input satisfies a first execution condition. In this exemplary embodiment, the determination is repeated while new coordinates of the input object are acquired during the period in which the first execution condition is not satisfied (i.e., during the period in which a negative result is obtained).

In this exemplary embodiment, the first execution condition is defined based on the distance from an outer edge of the display unit 301. Specifically, when an input object being operationally input enters a range defined by a distance W1 (FIG. 6), that is, when the distance from the outer edge of the display unit 301 to the input object becomes smaller than W1, it is determined that the first execution condition is satisfied.

Alternatively, the first execution condition may be defined based on the movement distance from when an operation input is started. In this case, if the movement distance from when an operation input is started exceeds a criterion distance L1 (FIG. 12), it is determined that the first execution condition is satisfied.

As will be described later, the first execution condition is set such that a positive result is readily obtainable, as compared with a second execution condition corresponding to a direction extending toward a region where there is no frame.

When a positive result is obtained in step S106, the operation detecting unit 352 proceeds to step S108 to enable the function corresponding to the operation input. For example, screen scrolling is enabled, movement of an icon to a subsequent page is enabled, or movement of an icon to a folder is enabled.

On the other hand, the operation detecting unit 352 proceeding to step S107 determines whether or not the operation input satisfies the second execution condition. In this exemplary embodiment, the determination is repeated while new coordinates of the input object are acquired during the period in which the second execution condition is not satisfied (i.e., during the period in which a negative result is obtained).

In this exemplary embodiment, the second execution condition is also defined based on the distance from an outer edge of the display unit 301. Specifically, when an input object being operationally input enters a range defined by a distance W2 (FIG. 6), that is, when the distance from the outer edge of the display unit 301 to the input object becomes smaller than W2, it is determined that the second execution condition is satisfied.

As mentioned above, the distance W2 in the second execution condition is set to be smaller than the distance W1 in the first execution condition. Specifically, in order to satisfy the second execution condition, it is necessary to approach the outer edge of the display unit 301 more than in the case of the first execution condition.

Alternatively, the second execution condition may be defined based on the movement distance from when an operation input is started. In this case, if the movement distance from when an operation input is started exceeds a criterion distance L2 (FIG. 12), it is determined that the second execution condition is satisfied.

In this case, the criterion distance L2 is set to be larger than the criterion distance L1. Specifically, in order to satisfy the second execution condition, the movement distance of the operation input has to be longer than in the case of the first execution condition.

When a positive result is obtained in step S107, the operation detecting unit 352 proceeds to step S108 to enable the function corresponding to the operation input. For example, screen scrolling is enabled, movement of an icon to a subsequent page is enabled, or movement of an icon to a folder is enabled.

Figure 6:
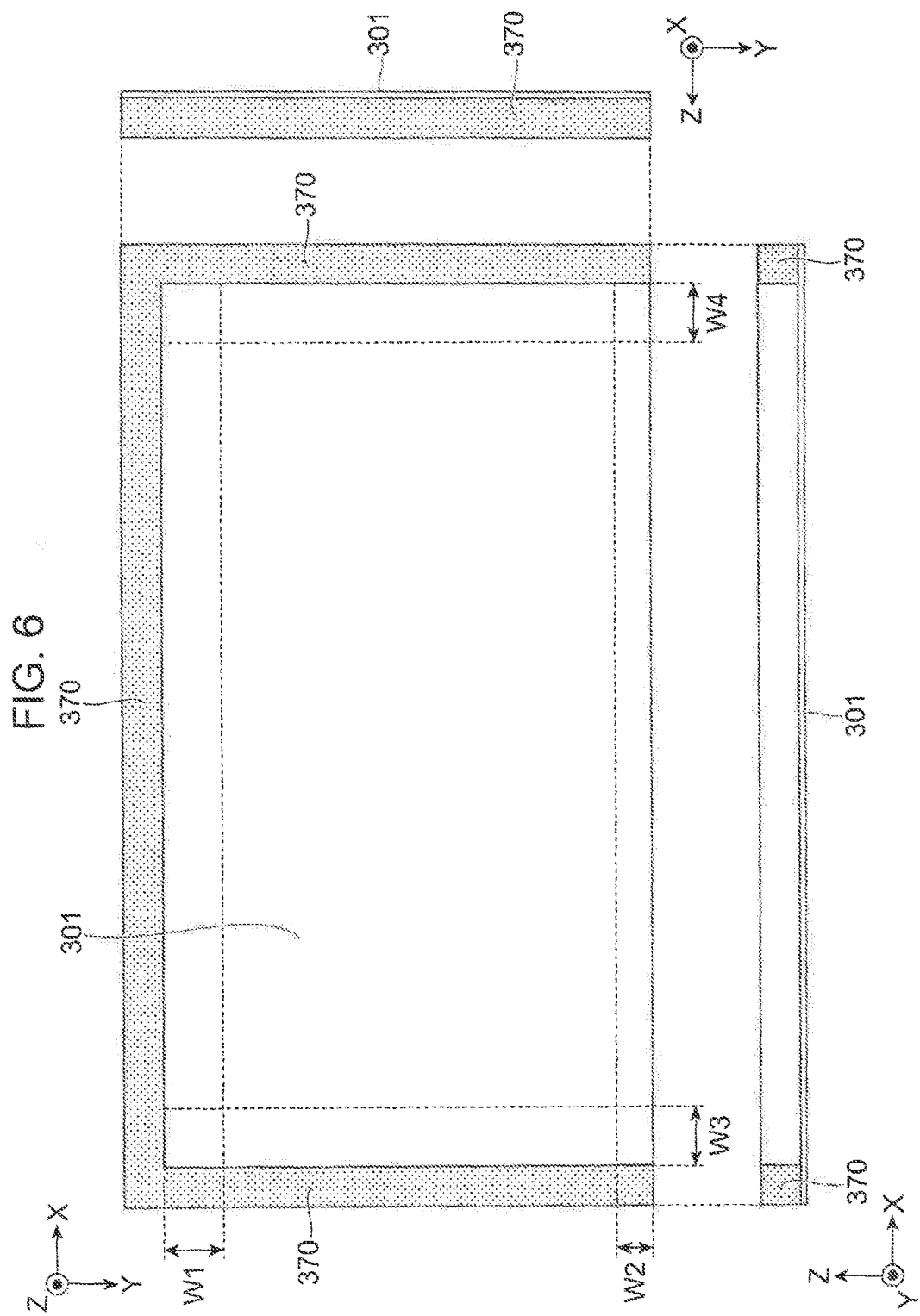
FIG. 6 illustrates a setting example of execution conditions.

FIG. 6 illustrates a setting example of the first and second execution conditions.

In FIG. 6, a frame 370 as a protrusion is disposed along three sides of the display unit 301, namely, the upper side, the left side, and the right side thereof, whereas the frame 370 is not disposed along the lower side of the display unit 301.

In FIG. 6, regions where screen scrolling and dragging of an icon are enabled are indicated by distances W1 to W4 from the outer edges of the display unit 301.

The region indicated by the distance W1 corresponds to an enabling region for a function provided at the upper side of the display unit 301 at which the frame 370 is disposed. The region indicated by the distance W2 corresponds to an enabling region for a function provided at the lower side of the display unit 301 at which the frame 370 is not disposed. The region indicated by the distance W3 corresponds to an enabling region for a function provided at the left side of the display unit 301 at which the frame 370 is disposed. The region indicated by the distance W4 corresponds to an enabling region for a function provided at the right side of the display unit 301 at which the frame 370 is disposed.

The distances W1, W3, and W4 are examples of distances that define the aforementioned first execution condition and are all set to selected values larger than that of the distance W2.

Although the distances W1 to W4 that provide the enabling regions to the respective sides are individually set in FIG. 6, the distances may have the relationship: W1=W3=W4. Needless to say, by setting a value individually for each side, it may be possible to change the width of the region for enabling the corresponding function in accordance with the direction.

Change of Display Image According to Operation Input Example

First Operation Input Example

Figure 7:
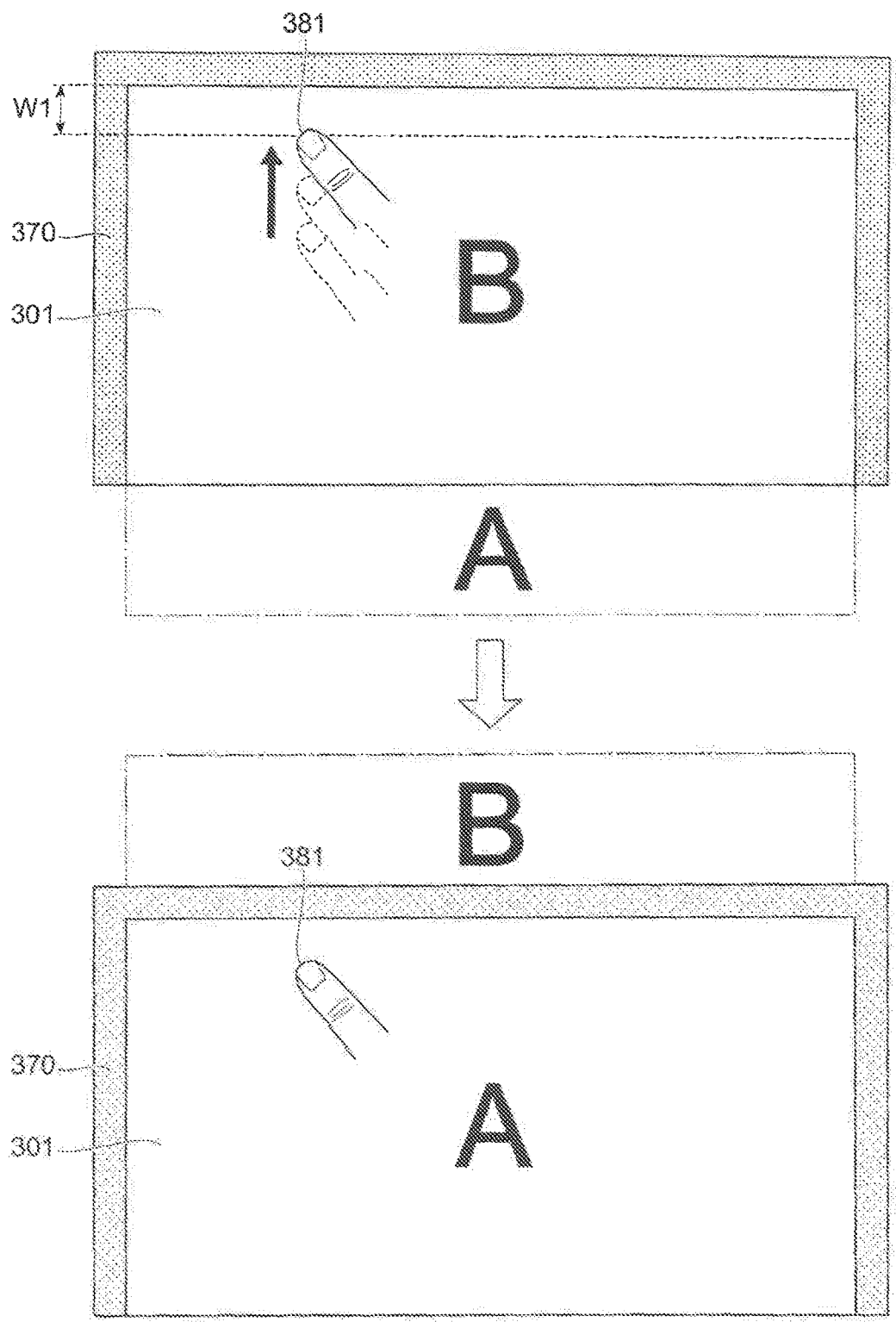
FIG. 7 illustrates a case where screen scrolling is performed toward the upper side in a state where page B is displayed on a display unit.

FIG. 7 illustrates a case where screen scrolling is performed toward the upper side in a state where page B is displayed on the display unit 301.

In FIG. 7, the trajectory of a fingertip 381 sliding toward the upper side is shown. In FIG. 7, the region where the function corresponding to the operation input is enabled is indicated by the range of the distance W1 from the upper side of the display unit 301, which the fingertip 381 enters. In the case of FIG. 7, the distance between the fingertip 381 indicated by a solid line and the upper side is shorter than the distance W1. Therefore, the page displayed on the display unit 301 is switched to page A located below page B.

Figure 8:
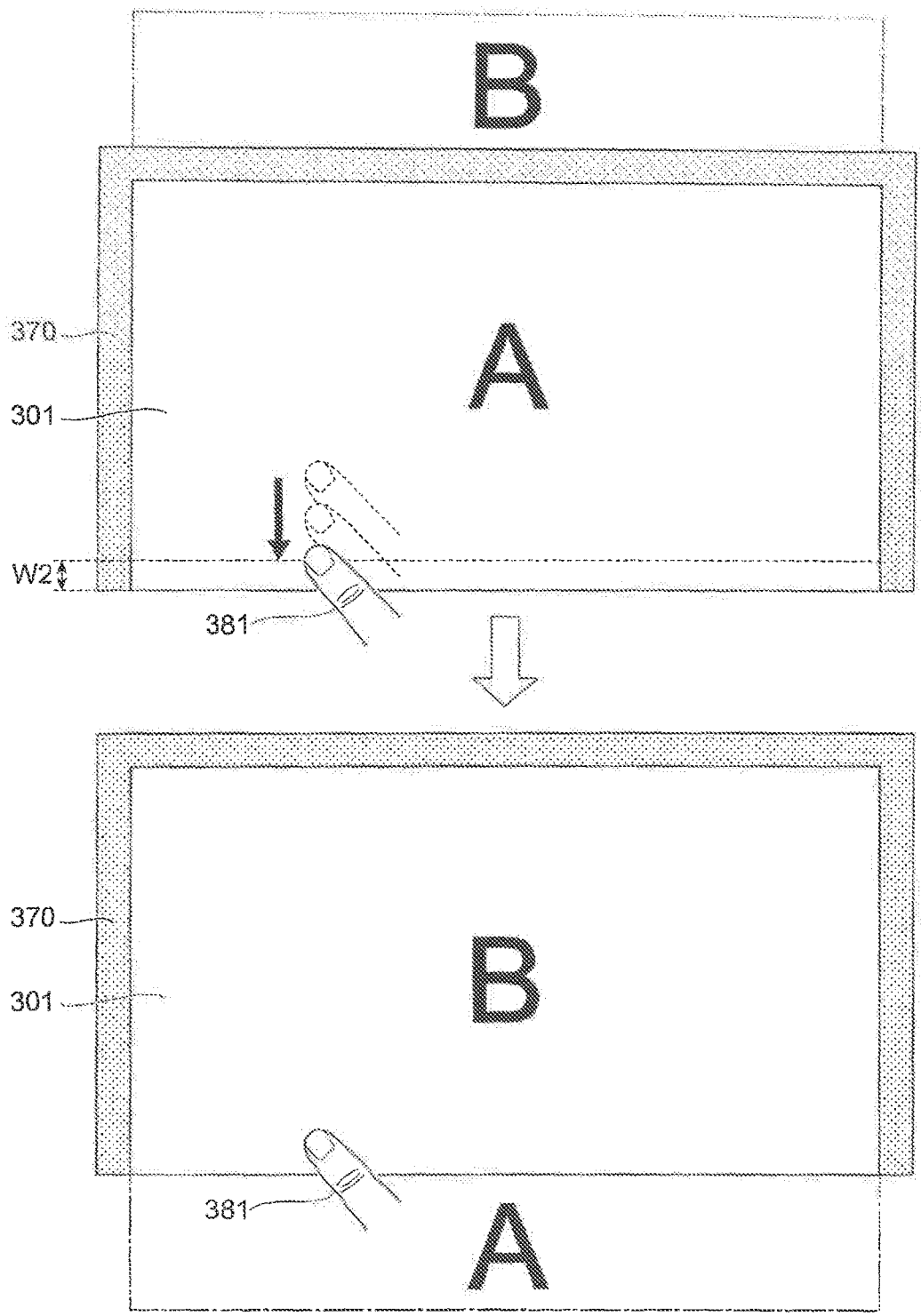
FIG. 8 illustrates a case where screen scrolling is performed toward the lower side in a state where page A is displayed on the display unit.

FIG. 8 illustrates a case where screen scrolling is performed toward the lower side in a state where page A is displayed on the display unit 301.

In FIG. 8, the region where the function corresponding to the operation input is enabled is indicated by the range of the distance W2 from the lower side of the display unit 301, which the fingertip 381 enters. In the case of FIG. 8, the distance between the fingertip 381 indicated by a solid line and the lower side is shorter than the distance W2. Therefore, the page displayed on the display unit 301 is switched to page B located above page A.

As shown in FIG. 7, an operation input toward the upper side of the display unit 301 where the frame 370 is located tends to be stopped just before reaching the upper side (i.e., the frame 370) of the display unit 301. However, as shown in FIGS. 7 and 8, the distance W1 that provides the range where screen scrolling toward the upper side is enabled is set to be longer than the distance W2 that provides the range where screen scrolling toward the lower side is enabled.

Therefore, even when the frame 370 is present in the screen-scrolling direction, screen scrolling may be readily executed.

The same applies to screen scrolling toward the right and left sides of the display unit 301.

Second Operation Input Example

Figure 9:
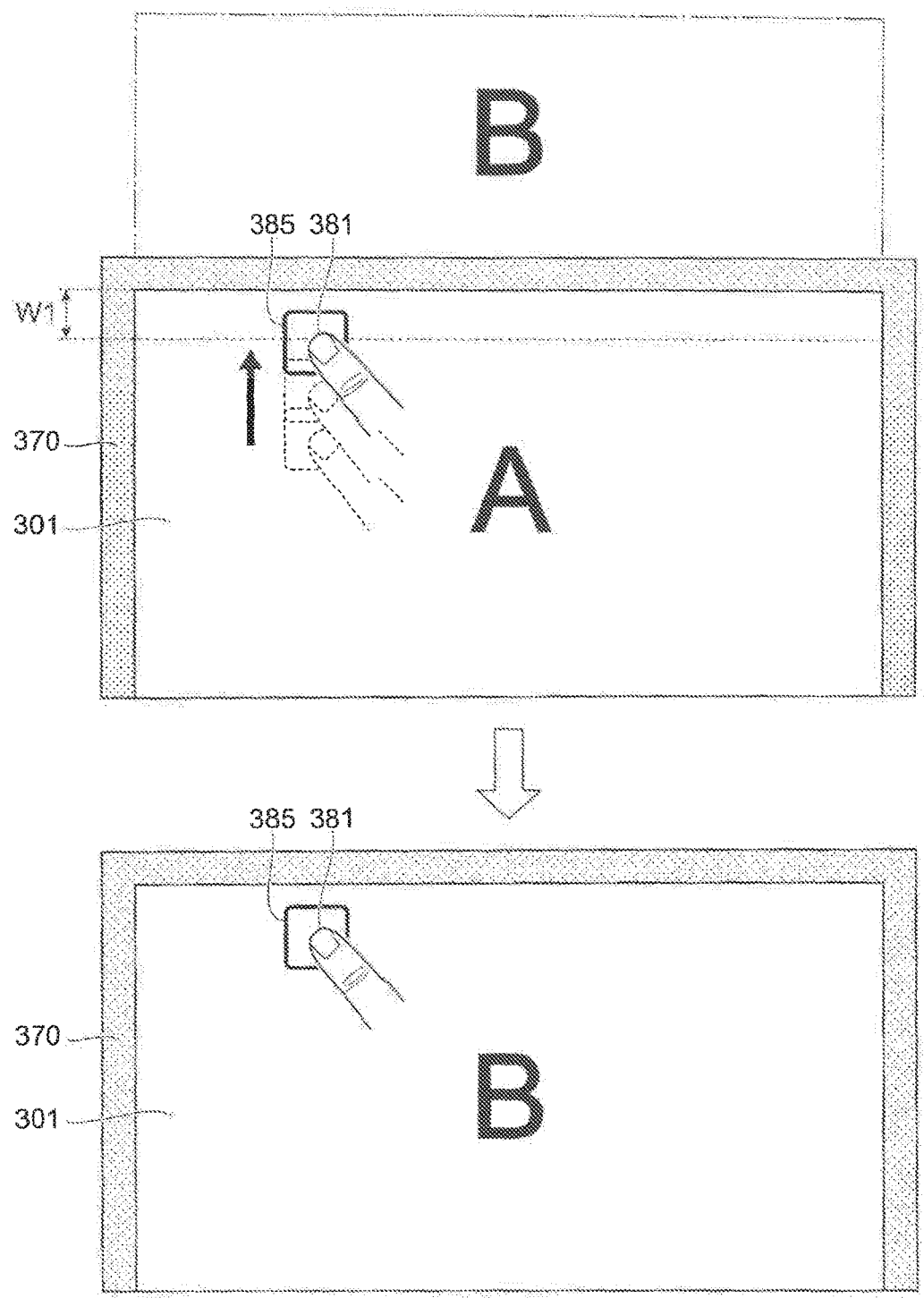
FIG. 9 illustrates a case where an icon is dragged to a subsequent page hidden at the upper side.

FIG. 9 illustrates a case where an icon 385 is dragged to a subsequent page hidden at the upper side.

In FIG. 9, the trajectory of the icon 385 dragged toward the upper side and the trajectory of the fingertip 381 dragging the icon 385 are shown. In this exemplary embodiment, the region where the function corresponding to the operation input is enabled is indicated by the range of the distance W1 from the upper side of the display unit 301, which the fingertip 381 enters. In the case of FIG. 9, the distance between the fingertip 381 indicated by a solid line and the upper side is shorter than the distance W1. Therefore, the icon 385 is moved from page A to page B.

FIG. 10 illustrates a case where the icon 385 is dragged to a subsequent page hidden at the lower side.

In this exemplary embodiment, the region where the function corresponding to the operation input is enabled is indicated by the range of the distance W2 from the lower side of the display unit 301, which the fingertip 381 enters. In the case of FIG. 10, the distance between the fingertip 381 indicated by a solid line and the lower side is shorter than the distance W2. Therefore, the icon 385 is moved from page B to page A.

As shown in FIG. 9, an operation input toward the upper side of the display unit 301 where the frame 370 is located tends to be stopped just before reaching the upper side (i.e., the frame 370) of the display unit 301. However, the distance W1 that provides the range where dragging toward the upper side is enabled is set to be longer than the distance W2 that provides the range where dragging toward the lower side is enabled.

Therefore, even when the frame 370 is present in the direction for dragging the icon 385, dragging may be readily executed.

The same applies to dragging the icon 385 toward the right and left sides of the display unit 301.

Third Operation Input Example

Figure 11:
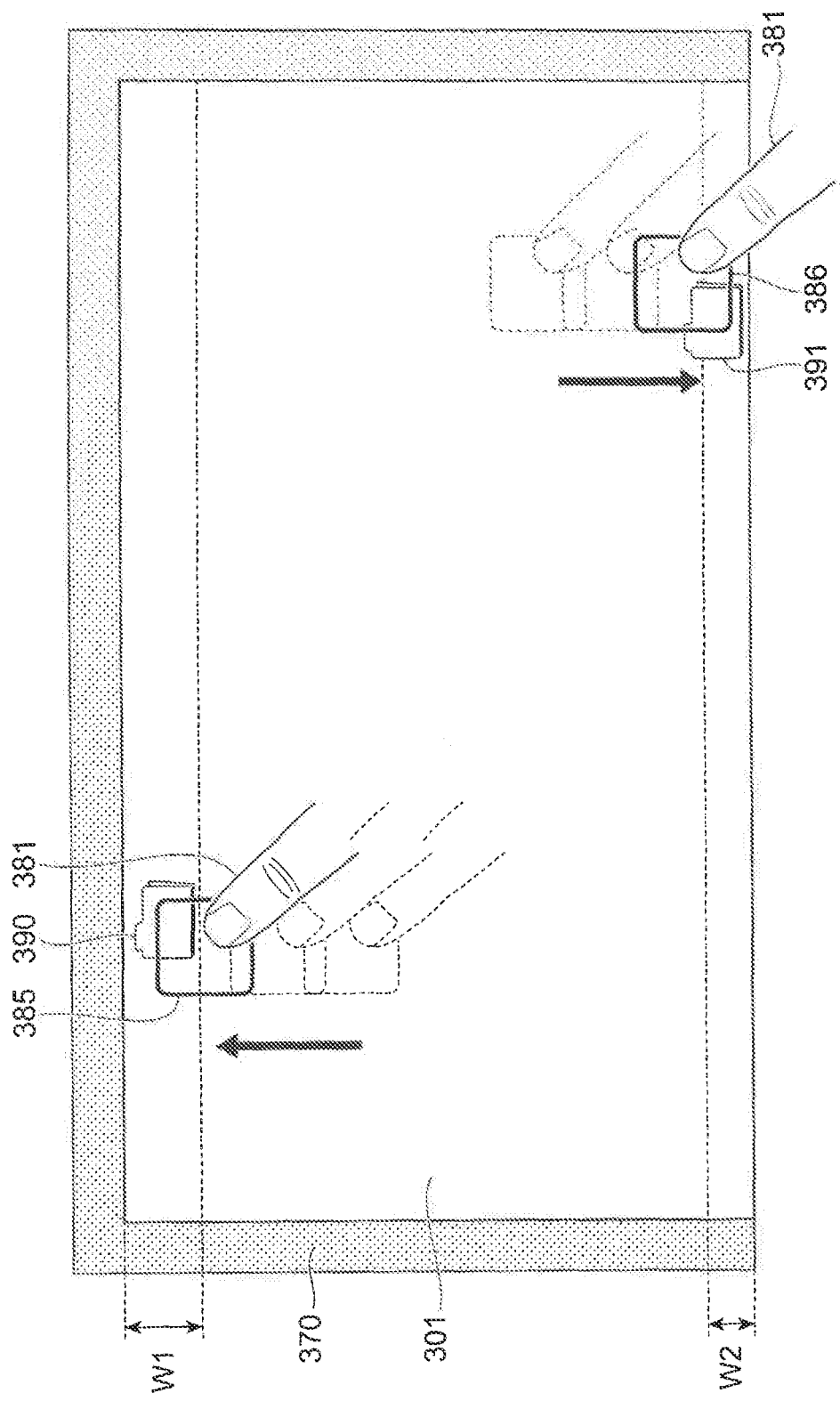
FIG. 11 illustrates a case where icons are dragged to folders.

FIG. 11 illustrates a case where icons 385 and 386 are dragged to folders 390 and 391.

Depending on the layout of the display screen, the folder 390 may be displayed at a position along the upper side of the display unit 301, or the folder 391 may be displayed at a position along the lower side of the display unit 301.

When the icon 385 is to be dragged to the folder 390 at the upper side, movement toward the folder 390 is enabled if the fingertip 381 enters the range of the distance W1 from the upper side of the display unit 301.

When the icon 386 is to be dragged to the folder 391 at the lower side, movement toward the folder 391 is enabled if the fingertip 381 enters the range of the distance W2 from the lower side.

Accordingly, the position where a movement of the icon 385 toward the folder 390 at the upper side where the frame 370 is located is enabled has a longer distance than the position where a movement of the icon 386 toward the folder 391 at the lower side is enabled.

Therefore, even when the user subconsciously stops dragging the icon 385 at a position distant from the upper side of the display unit 301, the movement of the icon 385 toward the folder 390 is treated as being enabled.

Fourth Operation Input Example

Figure 12:
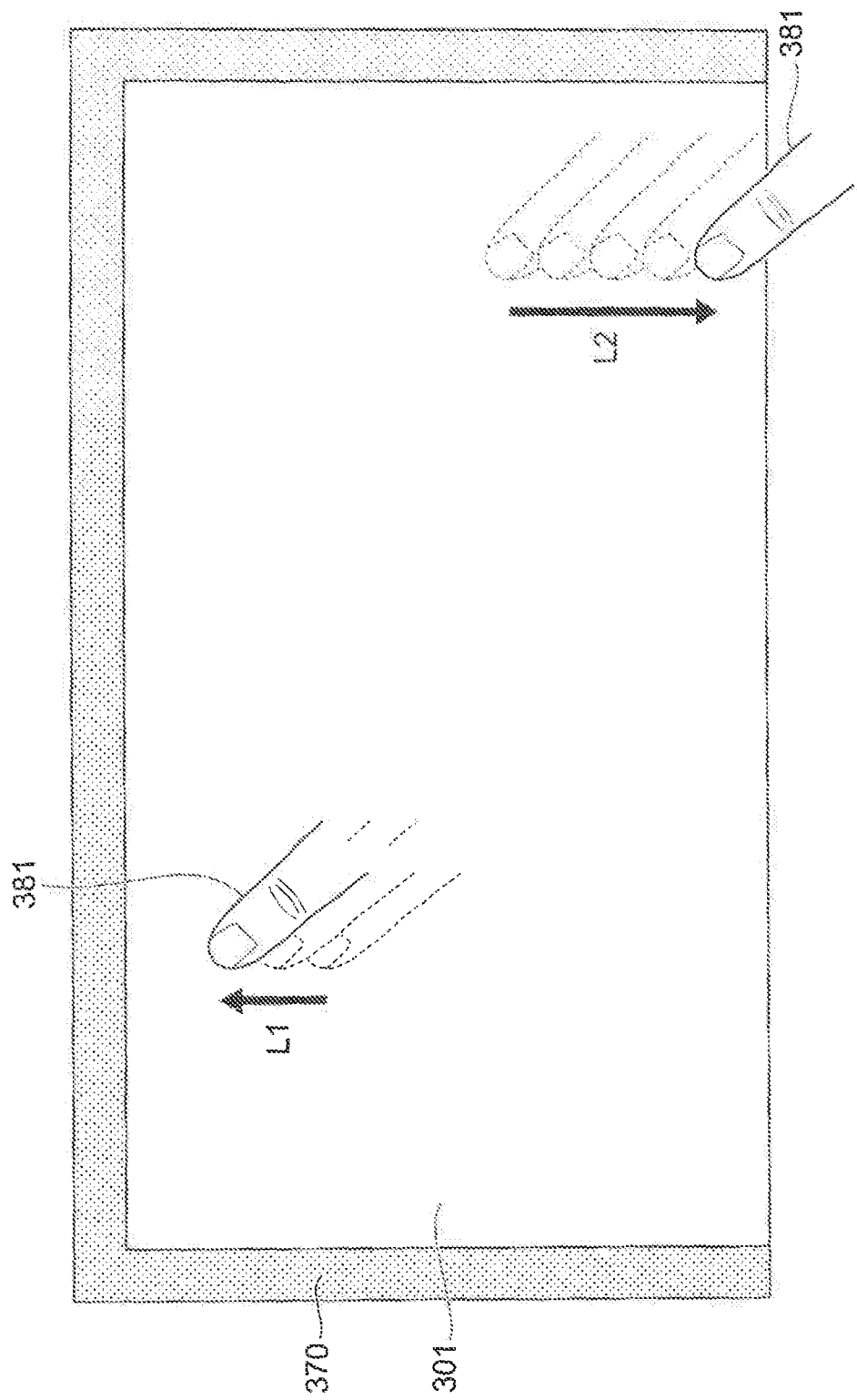
FIG. 12 illustrates a case where a movement distance of an operation input is used as an execution condition for enabling screen scrolling and dragging using a fingertip.

FIG. 12 illustrates a case where a movement distance of an operation input is used as an execution condition for enabling screen scrolling and dragging using the fingertip 381.

In the direction toward the upper side of the display unit 301 where the frame 370 is located, screen scrolling is enabled based on dragging by a distance L1.

In contrast, in the direction toward the lower side of the display unit 301 where the frame 370 is not located, screen scrolling is enabled based on dragging by a distance L2 (>L1).

The distance L1 is shorter than the distance L2 because the fingertip 381 moving toward the upper side of the display unit 301 where the frame 370 is located tends to be psychologically stopped just before reaching the frame 370. With these settings, the operation input according to each of the first to third operation input examples described above may be realized.

Second Exemplary Embodiment

In the first exemplary embodiment, a contact-type coordinate input device is used for detecting an operation input. In this exemplary embodiment, a noncontact-type coordinate input device is used for detecting an operation input.

Figure 13:
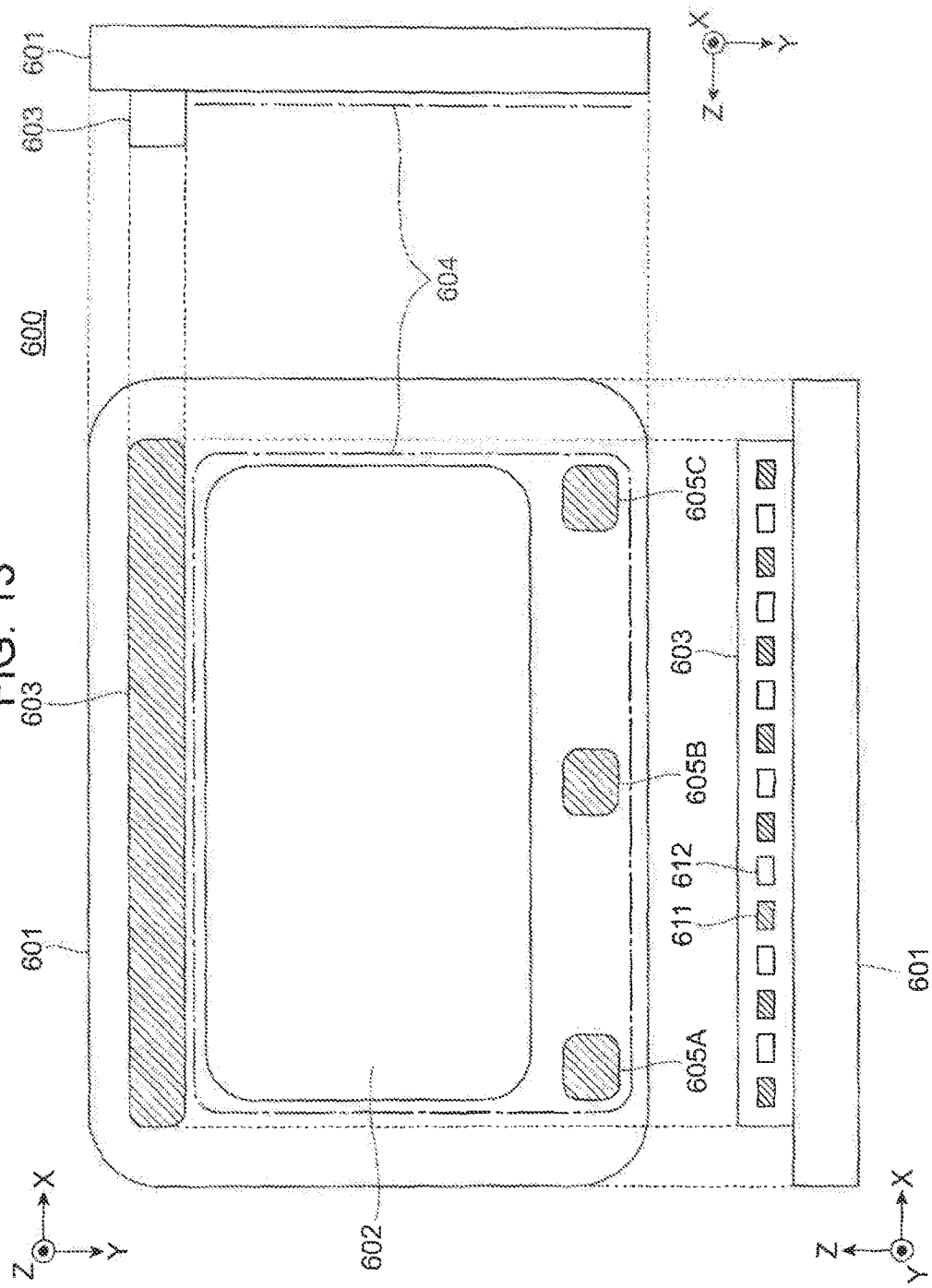
FIG. 13 is an external view of a tablet-type information terminal according to a second exemplary embodiment.

FIG. 13 is an external view of a tablet-type information terminal 600 according to a second exemplary embodiment.

The information terminal 600 is an example of an information processing apparatus. The information terminal 600 may be, for example, a smartphone or a gaming apparatus.

An upper surface of an apparatus body 601 of the information terminal 600 is provided with a display unit 602 that displays a display image and a coordinate detection sensor 603 that optically detects an operated position of an input object.

The coordinate detection sensor 603 is an example of a noncontact-type coordinate input device and is disposed so as to extend along one of the sides of the display unit 602. As shown in FIG. 13, the coordinate detection sensor 603 is installed so as to protrude from the upper surface of the apparatus body 601. In this example, the position where the coordinate detection sensor 603 is installed in the apparatus body 601 is fixed.

On a side surface of the coordinate detection sensor 603 provided with the display unit 602, light-emitting elements 611 that emit light and light-receiving elements 612 that receive light are alternately arranged, thereby forming a detection plane 604, which is parallel to the upper surface, in the space above the apparatus body 601. The detection plane 604 is an example of a detection region. In this case, a housing of the coordinate detection sensor 603 that accommodates these optical components serves as an example of a protrusion.

In this exemplary embodiment, the detection plane 604 defines the outer edges of the detection region.

In this exemplary embodiment, the light-emitting elements 611 are formed of, for example, light-emitting diodes (LEDs) that output infrared light. The light-receiving elements 612 are formed of, for example, photodiodes (PDs) that receive reflection light reflected from an input object (e.g., a finger or a pen) moving across the detection plane 604.

As shown in FIG. 13, the light-emitting elements 611 and the light-receiving elements 612 are alternately arranged in a line. The sizes and positions of the light-emitting elements 611 and the light-receiving elements 612 in FIG. 13 are enlarged for illustrative purposes. In actuality, the light-emitting elements 611 and the light-receiving elements 612 are arranged with the size and density according to the requested detection accuracy.

Figure 14:
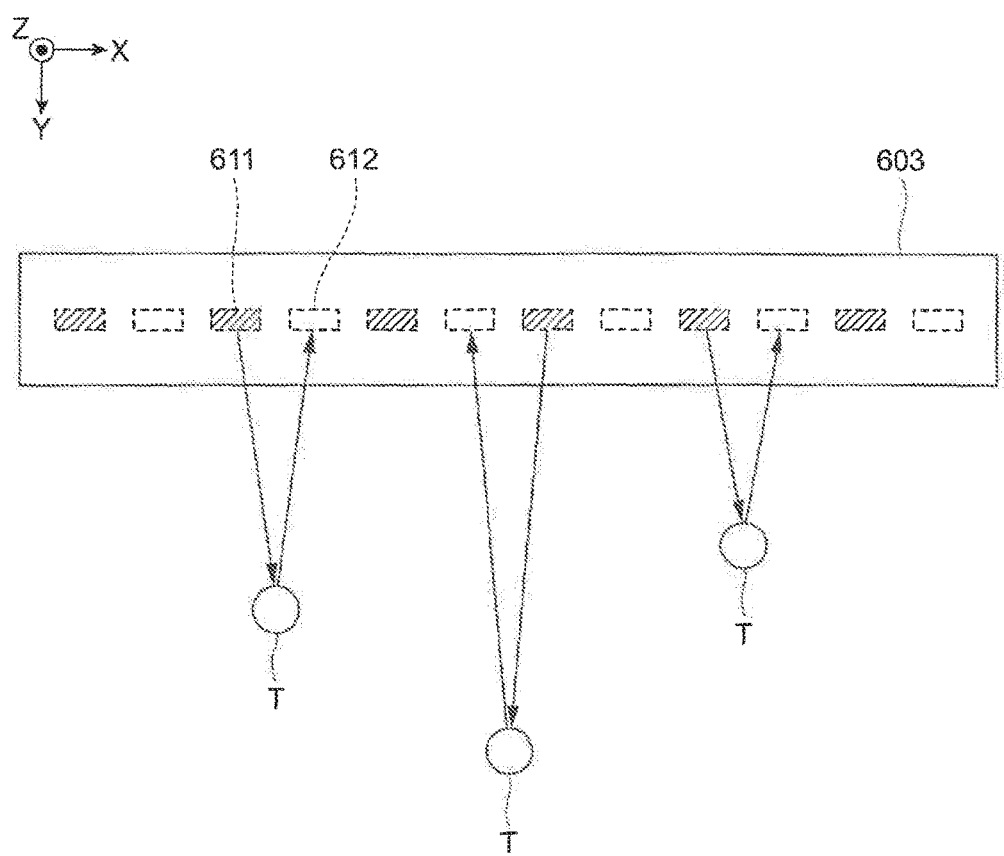
FIG. 14 illustrates how a coordinate detection sensor detects an input object.

FIG. 14 illustrates how the coordinate detection sensor 603 detects an input object T.

The coordinate detection sensor 603 used in this exemplary embodiment determines the position of the input object T in the direction in which the light-emitting elements 611 and the light-receiving elements 612 are arranged (i.e., an X-axis direction) in accordance with whether the reflection light from the input object T is detected by the light-receiving elements 612.

Moreover, the coordinate detection sensor 603 determines the position of the input object T in the direction away from the coordinate detection sensor 603 (i.e., a Y-axis direction) in accordance with the intensity of the light received by the light-receiving elements 612.

By utilizing the properties in which the intensity of the light received by the light-receiving elements 612 increases as the input object T moves toward the coordinate detection sensor 603 and the intensity of the light received by the light-receiving elements 612 decreases as the input object T moves away from the coordinate detection sensor 603, the coordinate detection sensor 603 determines the distance between the coordinate detection sensor 603 and the input object T.

The coordinate detection sensor 603 is capable of detecting multiple input objects T at once. Therefore, so-called multi-touch detection is possible.

Referring back to FIG. 13, because the coordinate detection sensor 603 used in this exemplary embodiment is of an optical type, the detection plane 604 is capable of detecting not only an operation input to an operator displayed on the display unit 602 but also an operation input to an icon (e.g., a back button 605A, a home button 605B, or a multitask button 605C) printed on the upper surface of the apparatus body 601.

These icons are an example of operators. The back button 605A is to be used as a command for, for example, returning the page screen displayed on the display unit 602 back to a preceding page. The home button 605B is to be used as a command for returning to a preregistered home screen. The multitask button 605C is to be used as a command for displaying a menu list or an application list.

The functions allocated to the icons are merely examples.

Hardware Configuration of Information Terminal

Figure 15:
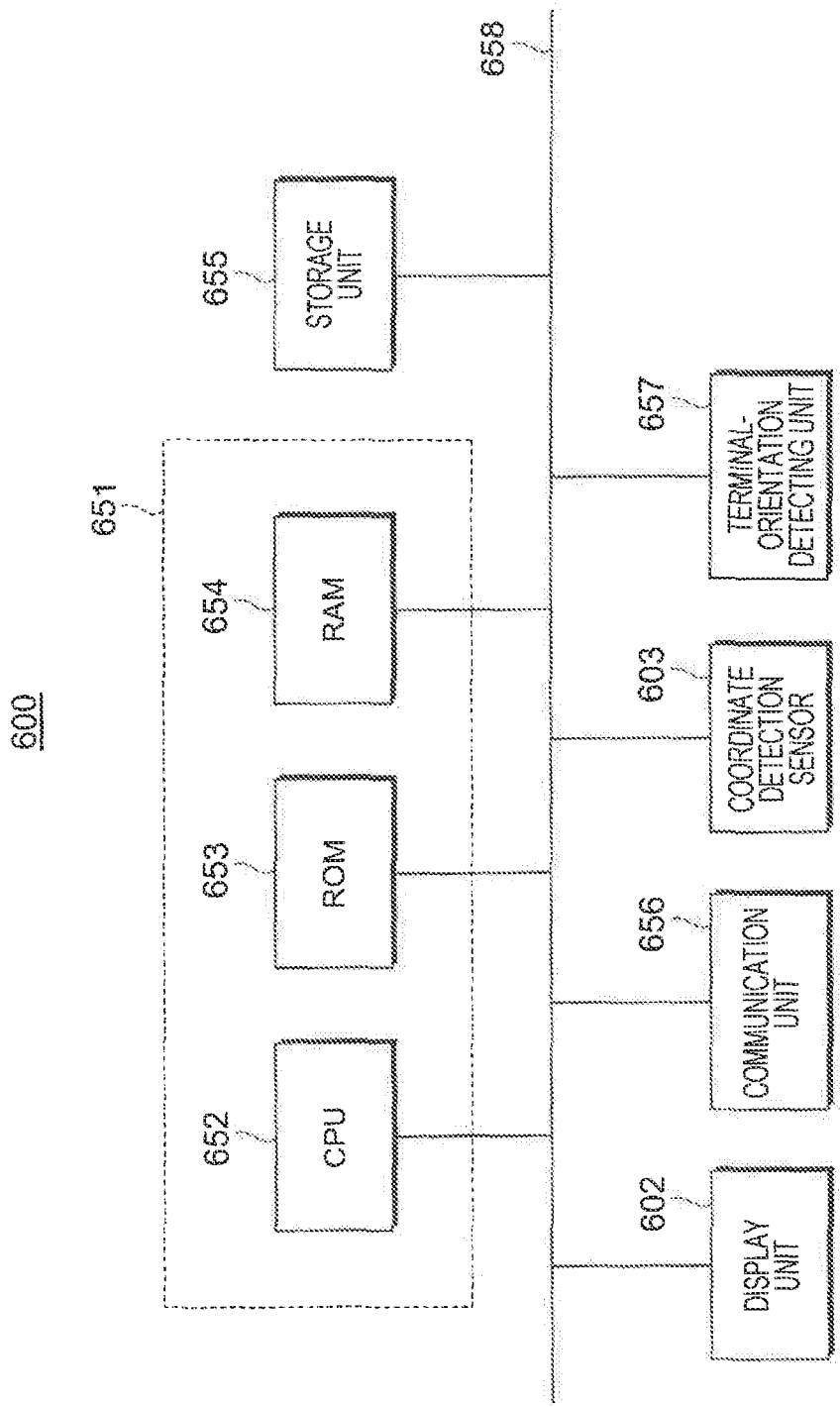
FIG. 15 illustrates an example of a functional block configuration of a controller and other devices constituting the information terminal.

FIG. 15 illustrates an example of a functional block configuration of a controller 651 and other devices constituting the information terminal 600.

The information terminal 600 has the controller 651 that controls the entire apparatus, the display unit 602 used for displaying an image, the coordinate detection sensor 603 that detects the coordinate position of an input object moving across the detection plane 604, a storage unit 655 used for storing various types of data and programs, a communication unit 656 used for communication with an external device, and a terminal-orientation detecting unit 657 that detects the orientation of the apparatus body 601 when in use.

These units are connected to one another by, for example, a bus 658 and exchange data via the bus 658.

The controller 651 includes a CPU 652, a ROM 653, and a RAM 654. The ROM 653 stores a program to be executed by the CPU 652. The CPU 652 uses the RAM 654 as a work area and executes the program read from the ROM 653. By executing the program, the units in the information terminal 600 are controlled.

The controller 651 in this exemplary embodiment provides the function of an input device together with the coordinate detection sensor 603.

The display unit 602 is formed of, for example, a liquid-crystal display panel or an organic electroluminescence (EL) display panel. In this exemplary embodiment, a contact-type coordinate input device, as in the first exemplary embodiment, is not provided.

The coordinate detection sensor 603 is integrally attached to the surface of the apparatus body 601.

The storage unit 655 is formed of a storage device, such as a hard disk device or a semiconductor memory.

The communication unit 656 is formed of, for example, a wireless local-area-network (LAN) interface.

The terminal-orientation detecting unit 657 includes, for example, an acceleration sensor and a geomagnetic sensor. In this exemplary embodiment, assuming that the side of the apparatus body 601 at which the upper side of the display unit 602 is disposed is defined as an upper edge, the roll about the Y axis (see FIG. 13), the pitch about the X axis (see FIG. 13), and the azimuth about the Z axis (see FIG. 13) are detected.

The terminal-orientation detecting unit 657 uses the rotational information and azimuth information about these axes to detect which side of the apparatus body 601 corresponds to the upper side on the display.

Figure 16:
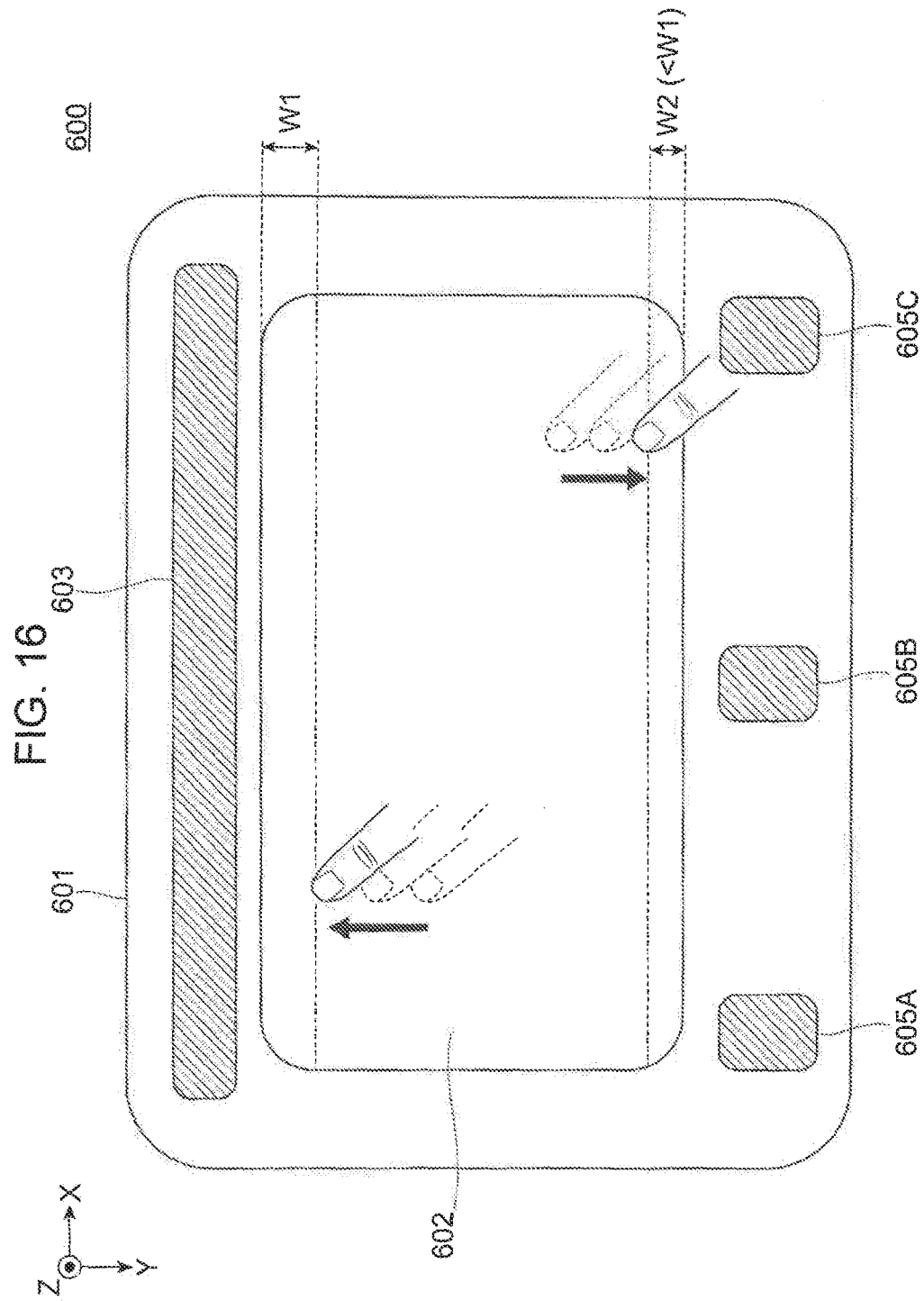
FIG. 16 illustrates a setting example of an enabling region provided at the upper side and an enabling region provided at the lower side.
Figure 17:
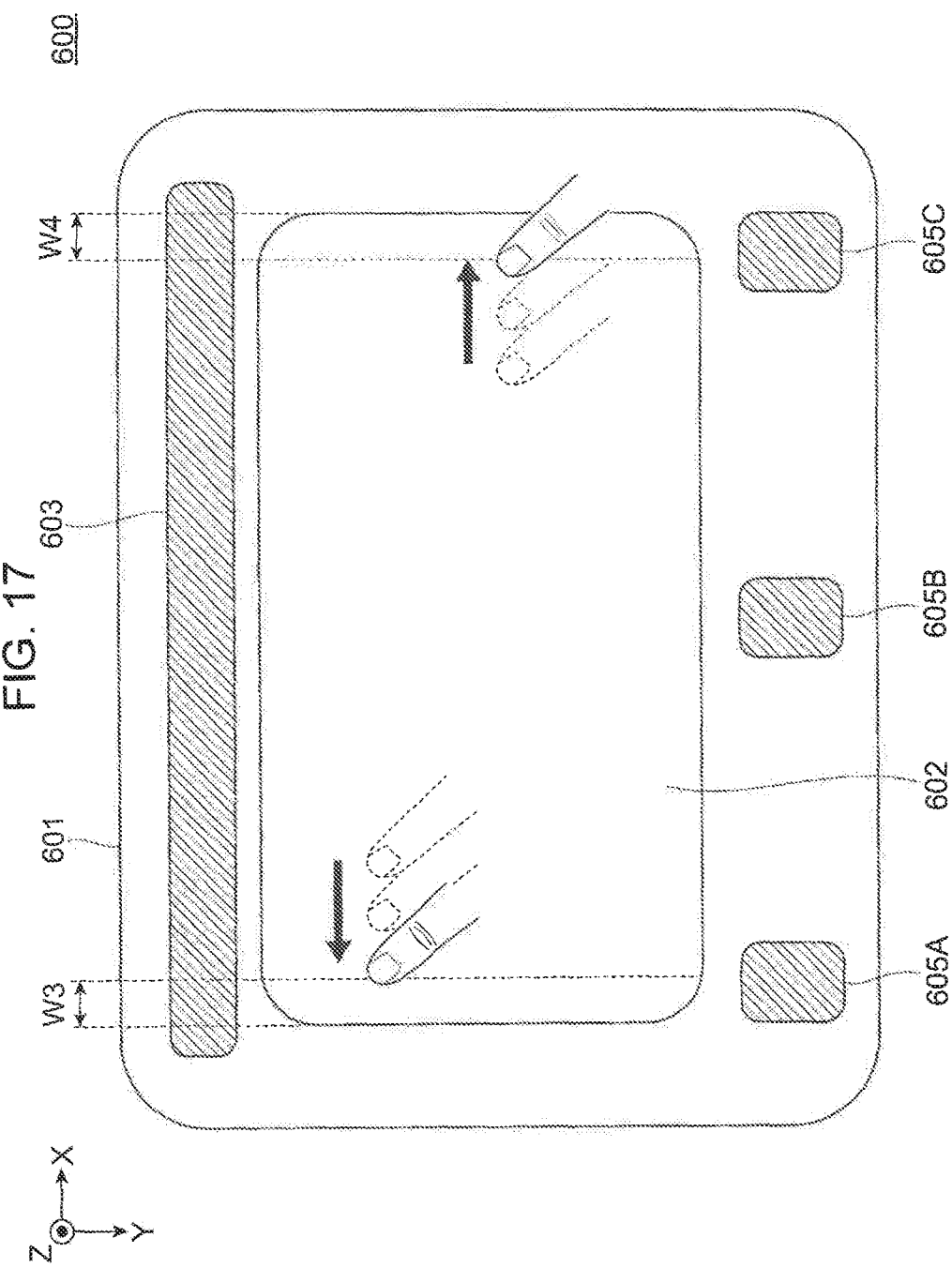
FIG. 17 illustrates an enabling region provided at the left side and an enabling region provided at the right side.

FIGS. 16 and 17 illustrate setting examples of first and second execution conditions in this exemplary embodiment.

FIG. 16 illustrates a setting example of an enabling region provided at the upper side and an enabling region provided at the lower side. FIG. 17 illustrates an enabling region provided at the left side and an enabling region provided at the right side.

The enabling region at the upper side is defined as a distance W1 from the upper side of the display unit 602, and the enabling region at the lower side is defined as a distance W2 (<W1) from the lower side of the display unit 602. The enabling region at the left side is defined as a distance W3 (<W1) from the left side of the display unit 602, and the enabling region at the right side is defined as a distance W4 (<W1) from the right side of the display unit 602.

The information about the outer-edge positions of the display unit 602 providing reference positions of the respective enabling regions is stored in, for example, the ROM 653 or the storage unit 655.

In this exemplary embodiment, the location where the coordinate detection sensor 603 as a protrusion exists is limited to the upper side of the display unit 301. Therefore, the distances W2, W3, and W4 defining the enabling regions at the lower side, the left side, and the right side of the display unit 602 where there are no psychological limitations may be equal to one another. Needless to say, by setting the distances W2, W3, and W4 to different values, the regions for enabling dragging may be provided with direction dependency.

In this exemplary embodiment, the operation input according to each of the first to fourth operation input examples described above may be similarly realized.

Third Exemplary Embodiment

In the above-described exemplary embodiments, the frame 370 (FIG. 6) and the coordinate detection sensor 603 (FIG. 13) as protrusions are both integrated with (fixed to) the apparatus body. In this exemplary embodiment, the coordinate detection sensor 603 is attachable to and detachable from the apparatus body.

Figure 18:
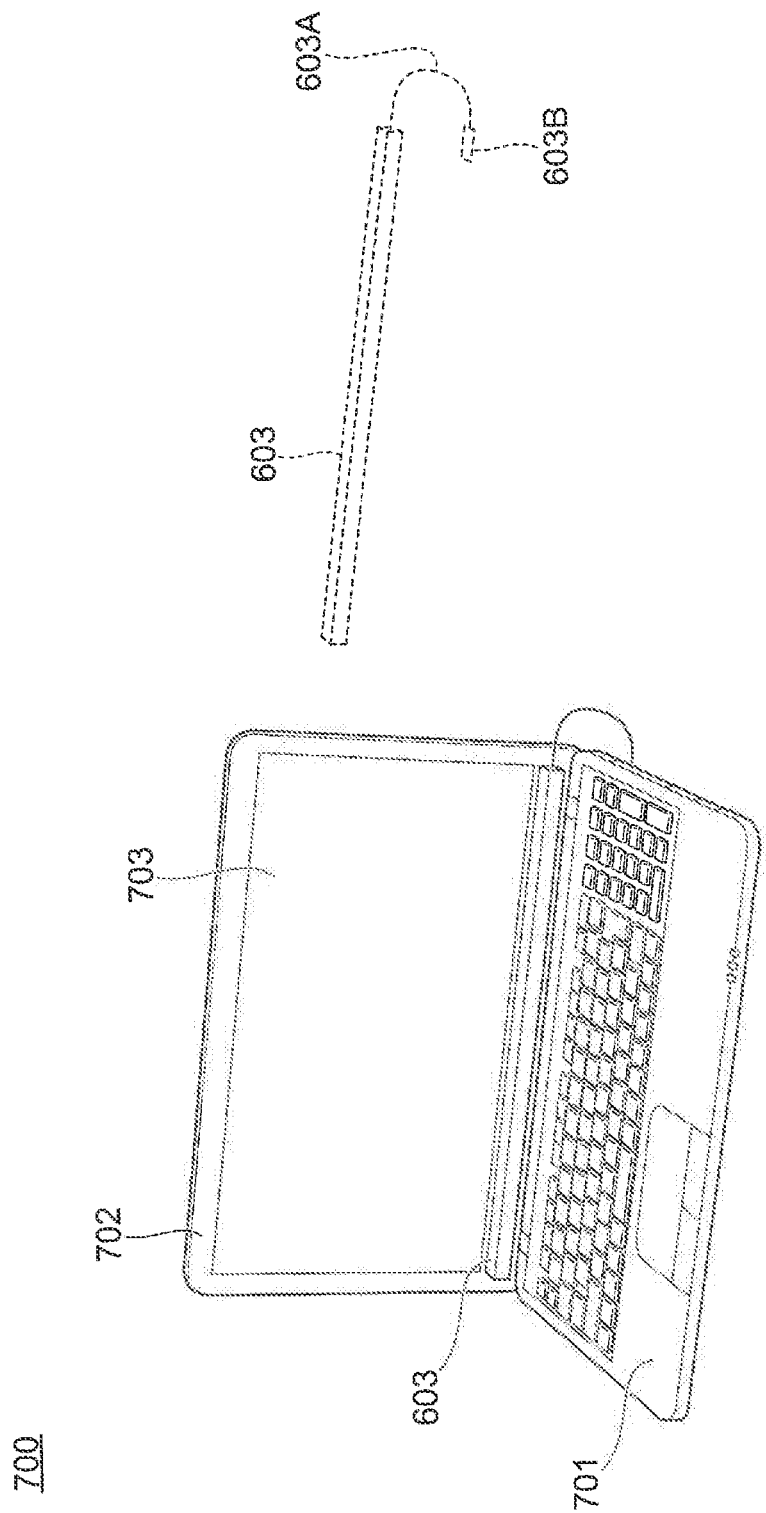
FIG. 18 is an external view of an information terminal, according to a third exemplary embodiment, to and from which the coordinate detection sensor is attachable and detachable.

FIG. 18 is an external view of an information terminal 700, according to a third exemplary embodiment, to and from which the coordinate detection sensor 603 is attachable and detachable. In this example, the information terminal 700 is a notebook-type computer. The information terminal 700 has an apparatus body 701 containing an electronic substrate and a hard disk device therein, and also has a cover 702 in which a display unit 703 is disposed.

In this exemplary embodiment, the coordinate detection sensor 603 is stored in an independent housing, and a connector 603B is attached to one end of the housing via a cable 603A. The connector 603B is for connecting to the apparatus body 701 and is used for data communication as well as for feeding power from the apparatus body 701.

Figure 19:
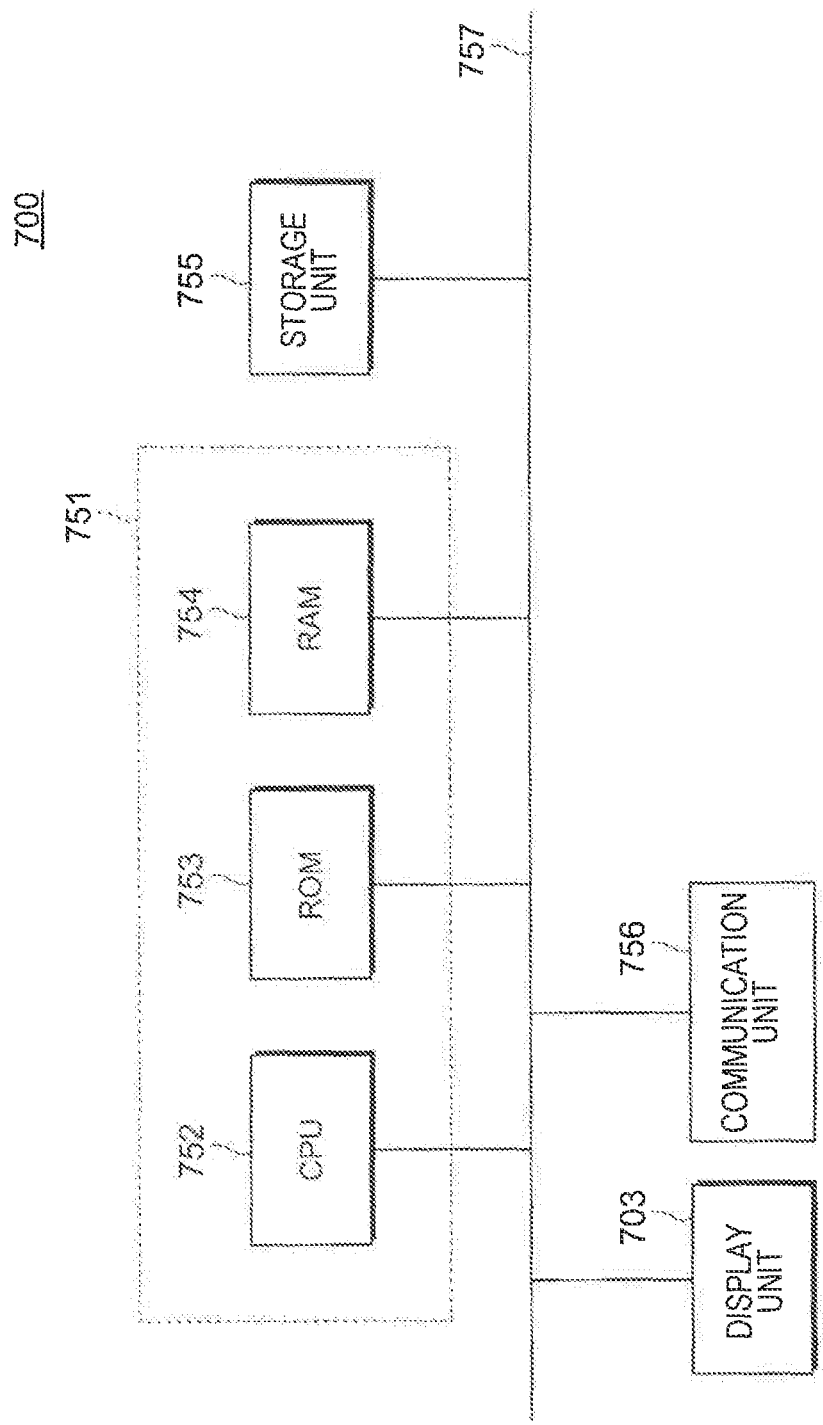
FIG. 19 illustrates an example of a functional block configuration of a controller and other devices constituting the information terminal.

FIG. 19 illustrates an example of a functional block configuration of a controller 751 and other devices constituting the information terminal 700. The information terminal 700 has the controller 751 that controls the entire apparatus, the display unit 703 used for displaying an image, a storage unit 755 used for storing various types of data and programs, and a communication unit 756 used for communication with an external device (such as the coordinate detection sensor 603).

These units are connected to one another by, for example, a bus 757 and exchange data via the bus 757.

The controller 751 includes a CPU 752, a ROM 753, and a RAM 754. The ROM 753 stores a program to be executed by the CPU 752. The CPU 752 uses the RAM 754 as a work area and executes the program read from the ROM 753. By executing the program, the units in the information terminal 700 are controlled.

The controller 751 in this exemplary embodiment provides the function of an input device together with the coordinate detection sensor 603.

In this exemplary embodiment, the CPU 752 functioning as the operation detecting unit 352 uses a dedicated interface screen for inputting the installation position of the coordinate detection sensor 603.

Figure 20:
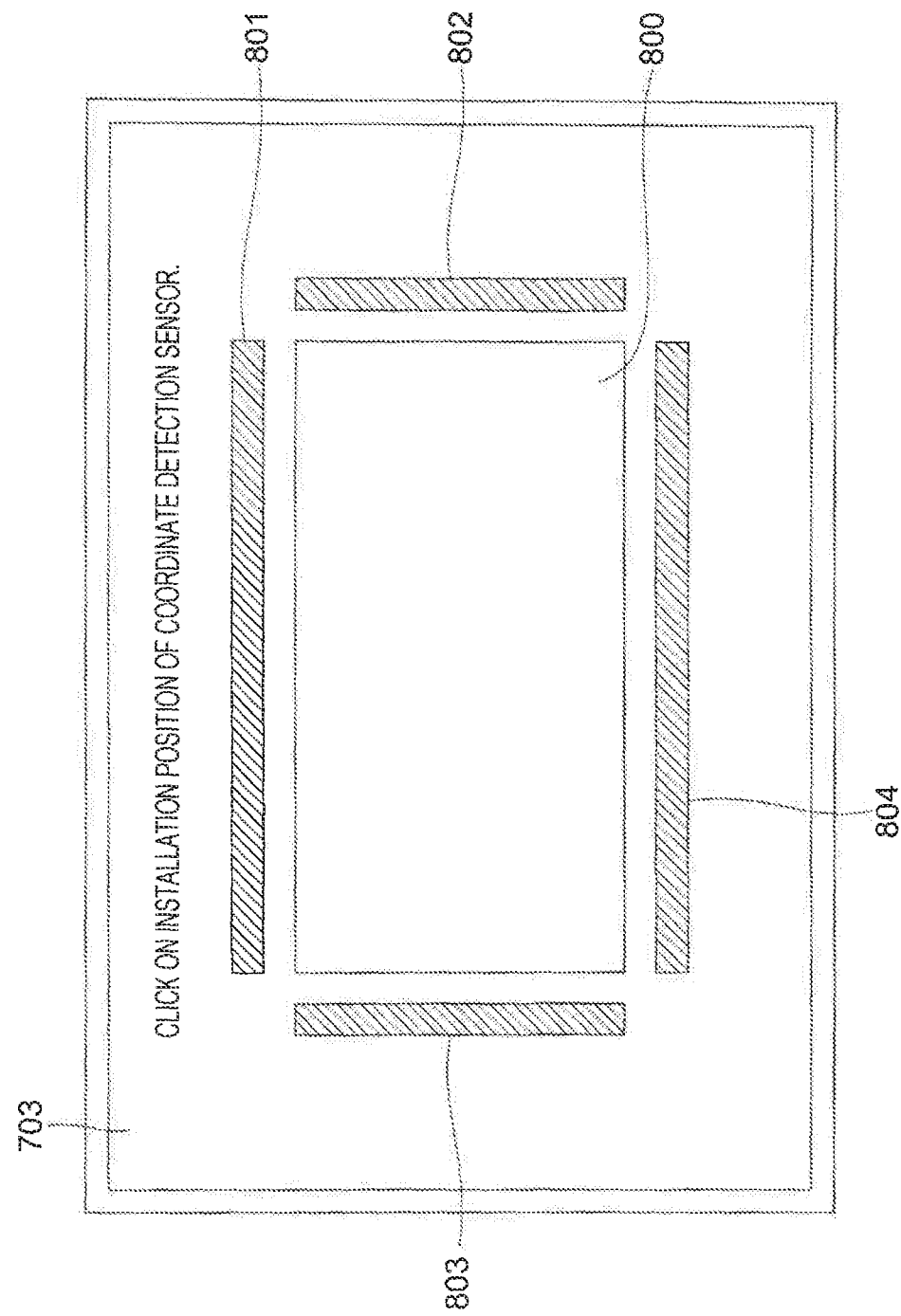
FIG. 20 illustrates an example of an interface screen displayed on the display unit for receiving the installation position of the coordinate detection sensor.

FIG. 20 illustrates an example of an interface screen displayed on the display unit 703 for receiving the installation position of the coordinate detection sensor 603. In this interface screen, installation-position candidates 801 to 804 are disposed along the four sides of a rectangle 800 indicating the position of the display unit 703.

The installation-position candidate 801 is disposed along the upper side of the rectangle 800, the installation-position candidate 802 is disposed along the right side of the rectangle 800, the installation-position candidate 803 is disposed along the left side of the rectangle 800, and the installation-position candidate 804 is disposed along the lower side of the rectangle 800.

The interface screen displays a guidance message "click on installation position of coordinate detection sensor". When the user clicks any of the installation-position candidates on the screen in accordance with the guidance message, the information about the clicked installation-position candidate is received as the position of the coordinate detection sensor 603.

In this exemplary embodiment, after the coordinate detection sensor 603 is installed, it may be necessary to perform a correcting operation for associating the output coordinates of the coordinate detection sensor 603 with the four sides of the display unit 703. This is because the regions where the function corresponding to the operation input is enabled are set with reference to the four sides of the display unit 703.

Upon completion of this correcting operation, even if the installation position of the coordinate detection sensor 603 in the apparatus body 701 or the display unit 703 changes, the operation-input-detection functional unit according to this exemplary embodiment may realize the operation input according to each of the first to fourth operation input examples described above, as in the first exemplary embodiment.

The coordinate detection sensor 603 has a height of, for example, 17 mm (i.e., height from the installation surface). This numerical value is merely an example and may be, for example, 10 mm or more. The same applies to the other protrusions described above.

Other Exemplary Embodiments

Although exemplary embodiments of the present invention have been described above, the technical scope of the invention is not to be limited to the scope defined in the above exemplary embodiments. It is obvious from the scope of the claims that various modifications and variations added to the above exemplary embodiments are included in the technical scope of the invention.

For example, although an operation performed on an operator displayed on the display unit 301 is detected by using a contact-type coordinate input device in the image forming apparatus 1 according to the first exemplary embodiment, the aforementioned contact-type coordinate input device may be replaced with a noncontact-type coordinate input device.

In the above exemplary embodiments, the image forming apparatus 1 and the information terminals 600 and 700 are exemplified as apparatuses to which the input device having the function of determining whether the effectiveness of an operation input in accordance with the positional relationship with the protrusion is applied. Alternatively, the input device may be applied to, for example, a smartphone, a portable gaming apparatus, a navigation apparatus, a transport-ticket vending machine, a ticket vending machine, or an automatic teller machine.

What is claimed is:

1. An input device comprising:
a display having a first outer edge and a second outer edge;
a protrusion located along the first outer edge;
an operation detector configured to detect an operation input within a detection region, the detection region corresponding to a display region of the display, the detection region including:
   a first function enabling area located along the first outer edge; and
   a second function enabling area located along the second outer edge, a width of the second function enabling area in a direction perpendicular to the second outer edge being less than a width of the first function enabling area in a direction perpendicular to the first outer edge; and
a processor operatively connected to the display and operation detector, the processor programmed to:
   display an operation screen on the display region of the display;
   determine whether the detected operation input is a continuous movement across the detection region;
   in response to a determination that the detected operation input is a continuous movement across the detection region, determine a direction of the continuous movement;
   in response to a determination that the direction of the continuous movement is oriented towards the protrusion, enable a function corresponding to the operation input once the continuous movement enters the first function enabling area; and
   in response to a determination that the direction of the continuous movement is oriented away from the protrusion, enable the function corresponding to the operation input once the continuous movement enters the second function enabling area.

2. The input device according to claim 1,
wherein the function is a movement of an operation target in a direction in which the continuous operation input is detected.

3. The input device according to claim 2,
wherein the movement includes scrolling of the operation screen.

4. The input device according to claim 2,
wherein the movement is a movement, toward a predetermined region, of an icon displayed on the operation screen.

5. The input device according to claim 1,
wherein enabling of the function is determined in accordance with a movement distance of the continuous movement.

6. The input device according to claim 1,
wherein, in a case where the protrusion is attachable to and detachable from an apparatus body, a positional relationship of the protrusion relative to the display is set in advance.

7. The input device according to claim 6,
wherein an installation position of the protrusion on the apparatus body is received via a setting screen.

8. The input device according to claim 1,
wherein the protrusion is a structural body accommodating the operation detector that optically detects the operation input.

9. The input device of claim 1, wherein no protrusion is located along the second outer edge.

10. An image forming apparatus comprising:
an image forming unit that forms an image onto a recording medium;
a display having a first outer edge and a second outer edge;
a protrusion located along the first outer edge;
an operation detector configured to detect an operation input within a detection region, the detection region corresponding to a display region of the display, the detection region including:
   a first function enabling area located along the first outer edge; and
   a second function enabling area located along the second outer edge, a width of the second function enabling area in a direction perpendicular to the second outer edge being less than a width of the first function enabling area in a direction perpendicular to the first outer edge; and
a processor operatively connected to the display and operation detector, the processor programmed to:
   display an operation screen on the display region of the display;
   determine whether the detected operation input is a continuous movement across the detection region;
   in response to a determination that the detected operation input is a continuous movement across the detection region, determine a direction of the continuous movement;
   in response to a determination that the direction of the continuous movement is oriented towards the protrusion, enable a function corresponding to the operation input once the continuous movement enters the first function enabling area; and
   in response to a determination that the direction of the continuous movement is oriented away from the protrusion, enable the function corresponding to the operation input once the continuous movement enters the second function enabling area.

11. A non-transitory computer readable medium storing a program causing a computer to execute a process, the process comprising:
detecting an operation input within a detection region of a display, the display having a first outer edge and a second outer edge, a protrusion being located along the first outer edge, the detection region corresponding to a display region of the display, the detection region including:
   a first function enabling area located along the first outer edge; and
   a second function enabling area located along the second outer edge, a width of the second function enabling area in a direction perpendicular to the second outer edge being less than a width of the first function enabling area in a direction perpendicular to the first outer edge;
displaying an operation screen on the display region of the display;
determining whether the detected operation input is a continuous movement across the detection region;
in response to a determination that the detected operation input is a continuous movement across the detection region, determining a direction of the continuous movement;
in response to a determination that the direction of the continuous movement is oriented towards the protrusion, enabling a function corresponding to the operation input once the continuous movement enters the first function enabling area; and in response to a determination that the direction of the continuous movement is oriented away from the protrusion, enabling the function corresponding to the operation input once the continuous movement enters the second function enabling area.

\* \* \* \* \*